(12) United States Patent
Blanco et al.

(10) Patent No.: US 7,584,174 B2
(45) Date of Patent: Sep. 1, 2009

(54) UPDATE DEPENDENCY CONTROL FOR MULTI-MASTER REPLICATION

(75) Inventors: Marcos Ares Blanco, Saint Martin d'Heres (FR); Joseph Reveane, Saint Bernard du Touvet (FR)

(73) Assignee: Sun Microsystems, Inc., Santa Clara, CA (US)

( * ) Notice: Subject to any disclaimer, the term of this patent is extended or adjusted under 35 U.S.C. 154(b) by 734 days.

(21) Appl. No.: 10/835,977

(22) Filed: Apr. 30, 2004

(65) Prior Publication Data

US 2004/0230619 A1    Nov. 18, 2004

(30) Foreign Application Priority Data

May 15, 2003   (FR) .................................. 03 05836

(51) Int. Cl.
*G06F 7/00*    (2006.01)
(52) U.S. Cl. ......................................................... 707/3
(58) Field of Classification Search ................ 707/1–10
See application file for complete search history.

(56) References Cited

U.S. PATENT DOCUMENTS

| | | | |
|---|---|---|---|
| 5,873,097 A * | 2/1999 | Harris et al. ................ 707/203 |
| 6,199,204 B1 * | 3/2001 | Donohue .................... 717/178 |
| 6,247,017 B1 | 6/2001 | Martin |
| 6,301,589 B1 | 10/2001 | Hirashima et al. |
| 6,381,742 B2 * | 4/2002 | Forbes et al. ................ 717/176 |
| 6,615,223 B1 | 9/2003 | Shih et al. |
| 6,820,259 B1 * | 11/2004 | Kawamata et al. .......... 717/173 |
| 7,016,976 B2 * | 3/2006 | Merrells et al. ............. 709/245 |
| 2001/0027445 A1 | 10/2001 | Eichelsdoerfer et al. |
| 2002/0064149 A1 * | 5/2002 | Elliott et al. ................ 370/352 |
| 2003/0088587 A1 | 5/2003 | Merrells et al. |
| 2003/0088615 A1 | 5/2003 | Good et al. |
| 2004/0230615 A1 | 11/2004 | Blanco et al. |

FOREIGN PATENT DOCUMENTS

EP    716 382    6/1996

* cited by examiner

*Primary Examiner*—Wilson Lee
(74) *Attorney, Agent, or Firm*—Robert C. Kowert; Meyertons, Hood, Kivlin, Kowert & Goetzel, P.C.

(57) ABSTRACT

The invention proposes a directory server system having a master server and a non-master server, each server being capable of storing directory server data comprising updates. The master server is capable of sending selected updates to the non-master server, and the non-master server (512) has:
   a dependency checker (5224) operable for determining whether each update received from the master server (510) depends on other updates among the selected updates, and if not for sending the update to an update application function (5220),
the update application function being operable for applying the updates received from the dependency checker in the non-master server directory server data.

37 Claims, 17 Drawing Sheets

UPDATE DEPENDENCY CONTROL FOR MULTI-MASTER REPLICATION

This invention relates to distributed computer systems.

In certain fields of technology, complete computer systems, including a diversity of equipments, are optimized for storing and retrieving data. Such systems may provide services to user machines related to a local network, e.g., an Intranet, or to a global network, e.g. the Web network.

It is desirable that network users can access, upon a query, to a large number of data, making it possible for the network users to create their own dynamic web site or to consult a dynamic web site, for example an e-commerce site on a multi platform computer system (Solaris, Windows NT). These queries are directed to a directory, e.g. using the LDAP protocol, and managed by a directory server. It is further desirable that this access to a large number of data be made possible more rapidly for each query arriving after a first query.

A general aim of the present invention is to provide advances in these directions.

Broadly, there is proposed a directory server system having a master server and a non-master server, each server being capable of storing directory server data comprising updates, the master server being capable of sending selected updates to the non-master server, and the non-master server having:
- a dependency checker operable for determining whether each update received from the master server depends on other updates among the selected updates, and if not for sending the update to an update application function,
- the update application function being operable for applying the updates received from the dependency checker in the non-master server directory server data.

There is also proposed a method of operating a master server in a directory server system, having a master server and a non-master server, each server being capable of storing directory server data comprising updates, the master server being capable of sending selected updates to the non-master server, the method comprising the steps of:
a) determining whether each update received by the non-master server from the master server depends on other updates among the selected updates, and if step a) fails
b) applying an update in the non-master server directory server data.

This invention may also be defined as an apparatus or system, and/or as software code for implementing the method, or for use in the system, and/or as portions of such software code, in all their alternative embodiments to be described hereinafter.

Other alternative features and advantages of the invention will appear in the detailed description below and in the appended drawings, in which.

Figure 7:
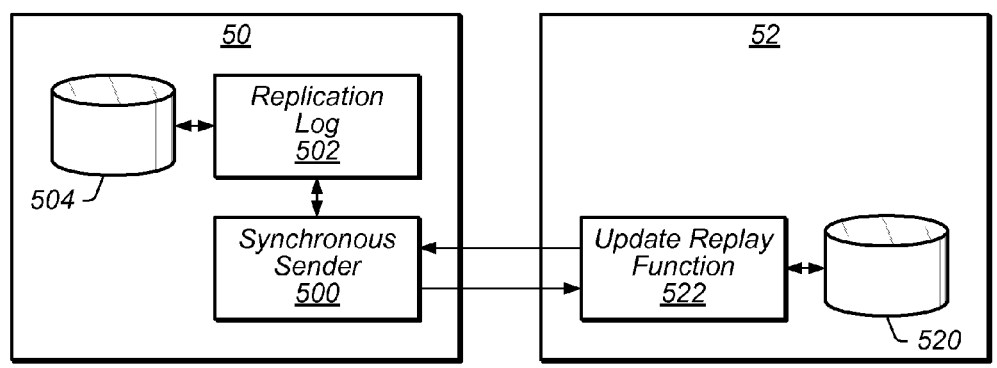
Figure 8:
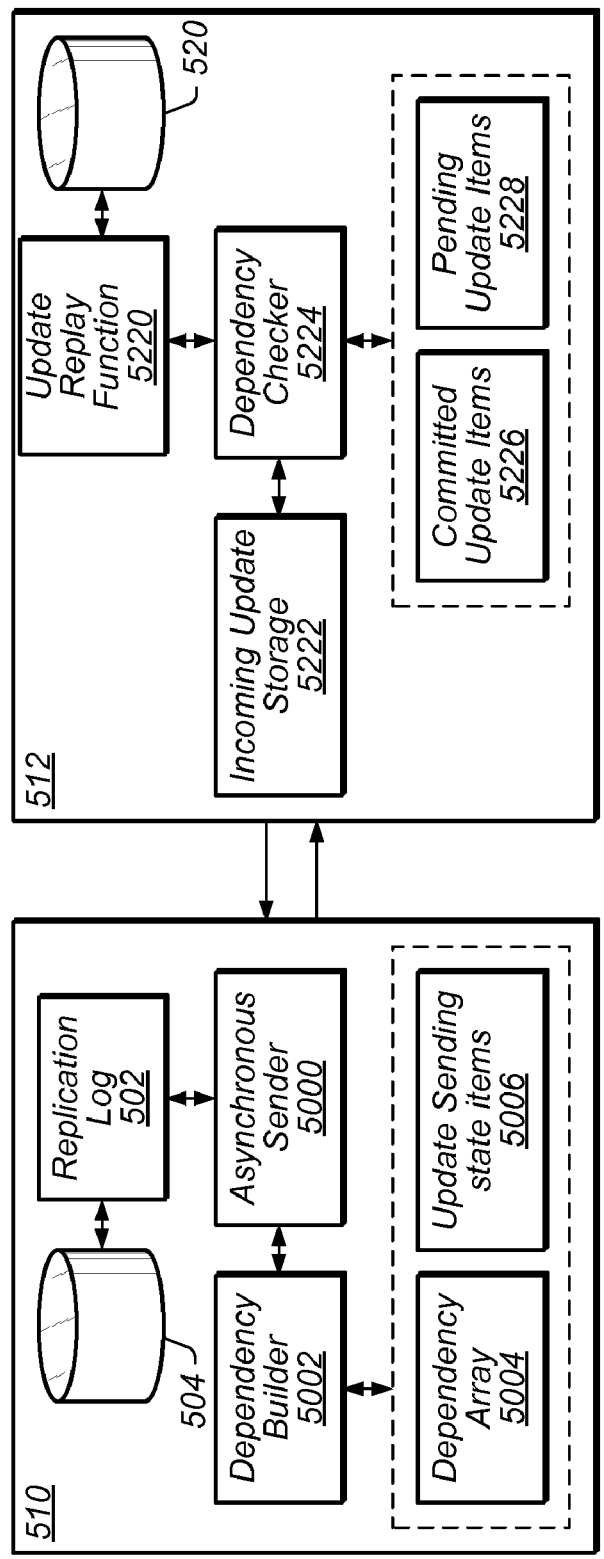
Figure 9:
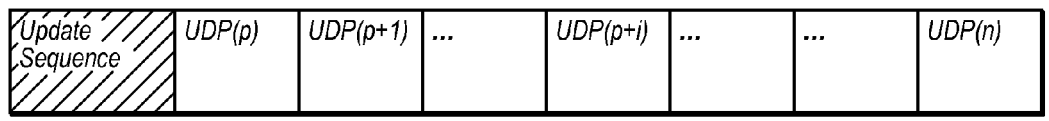
Figure 11:
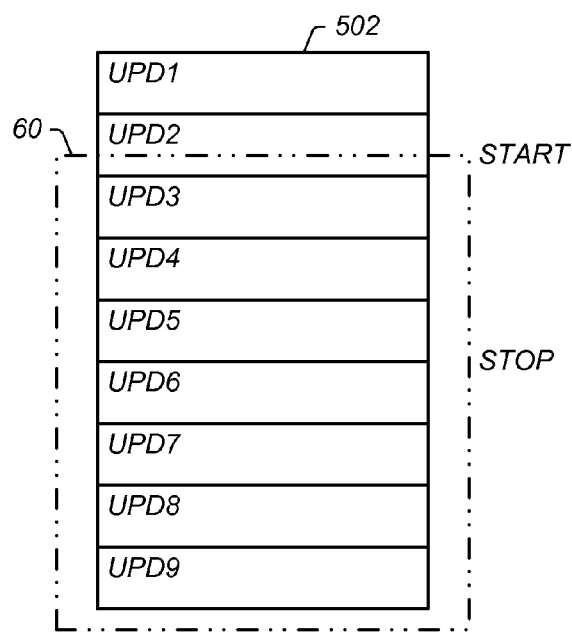
Figure 12:
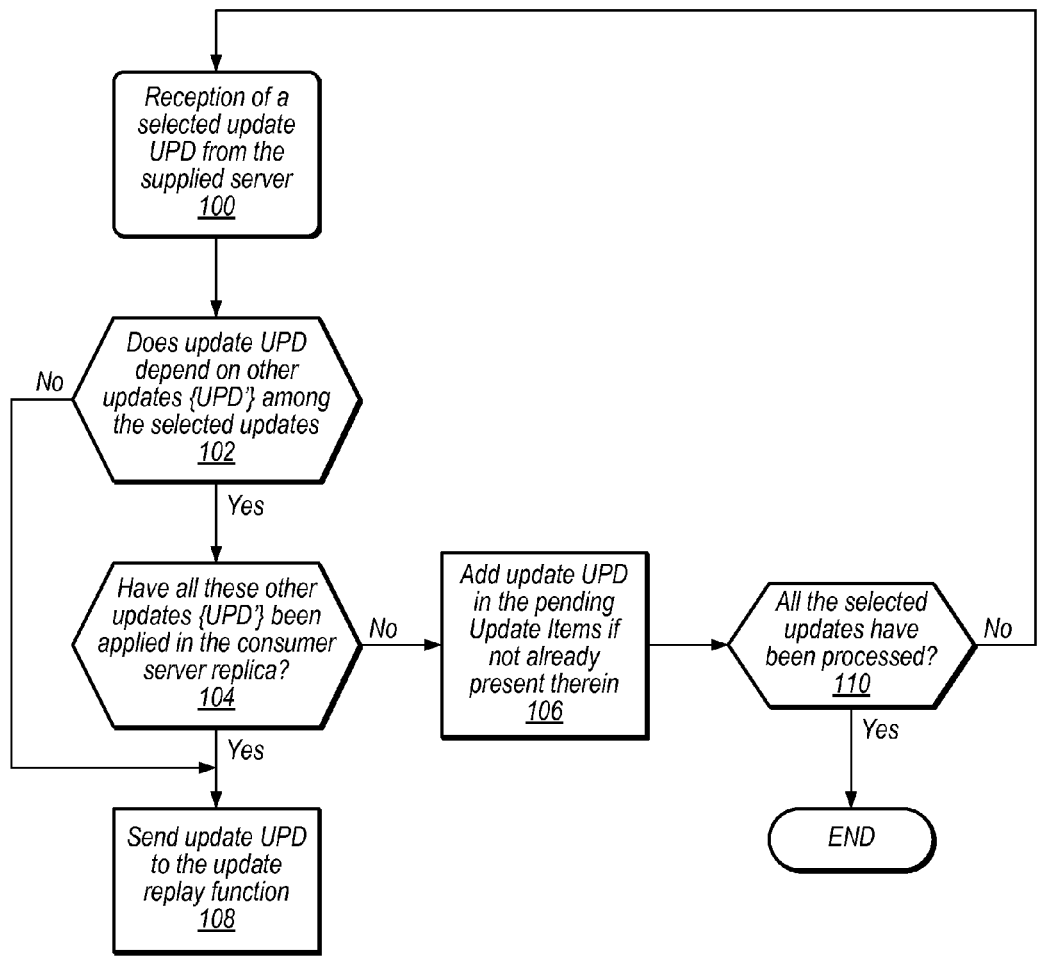
Figure 14:
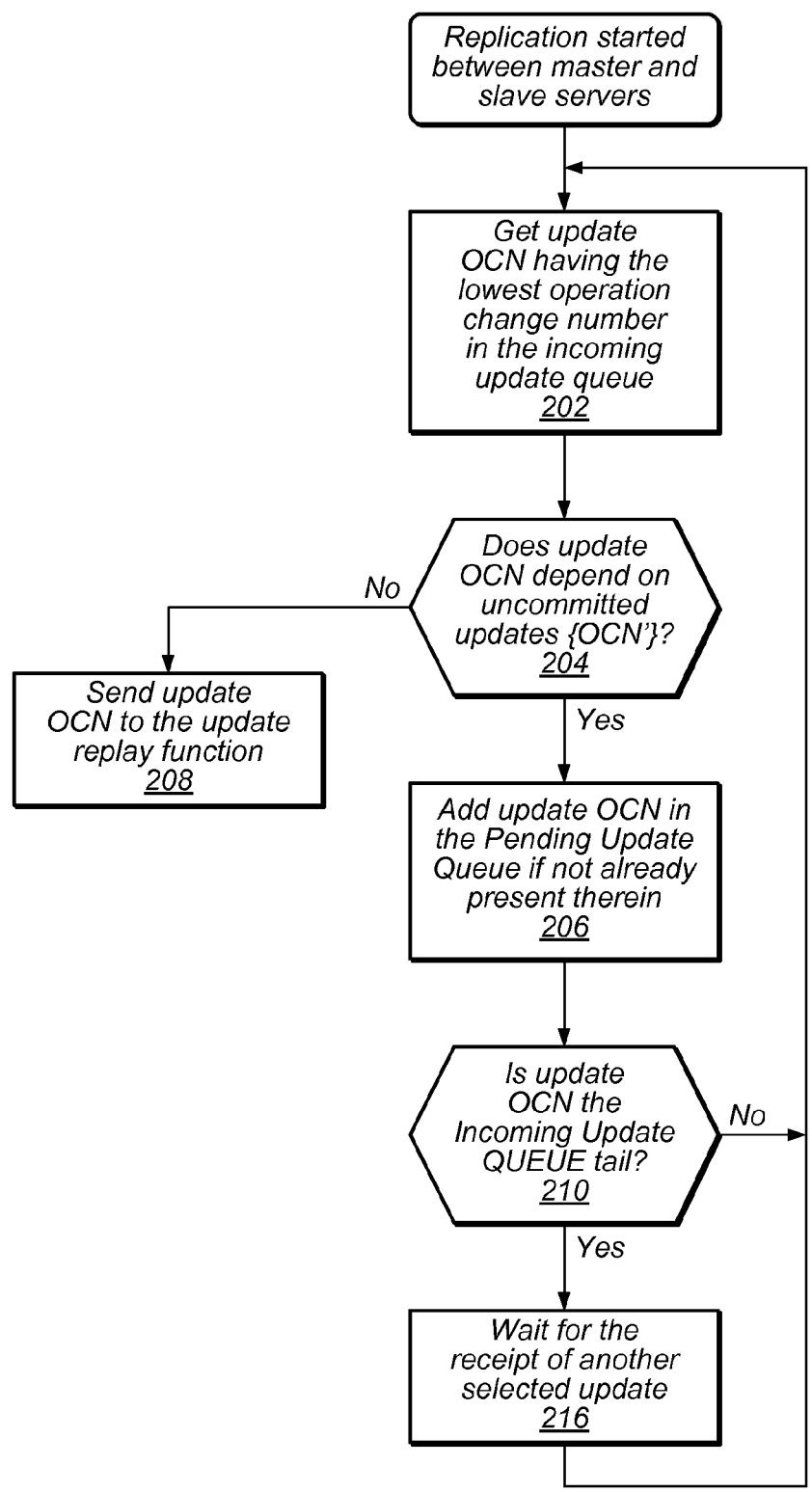
Figure 15:
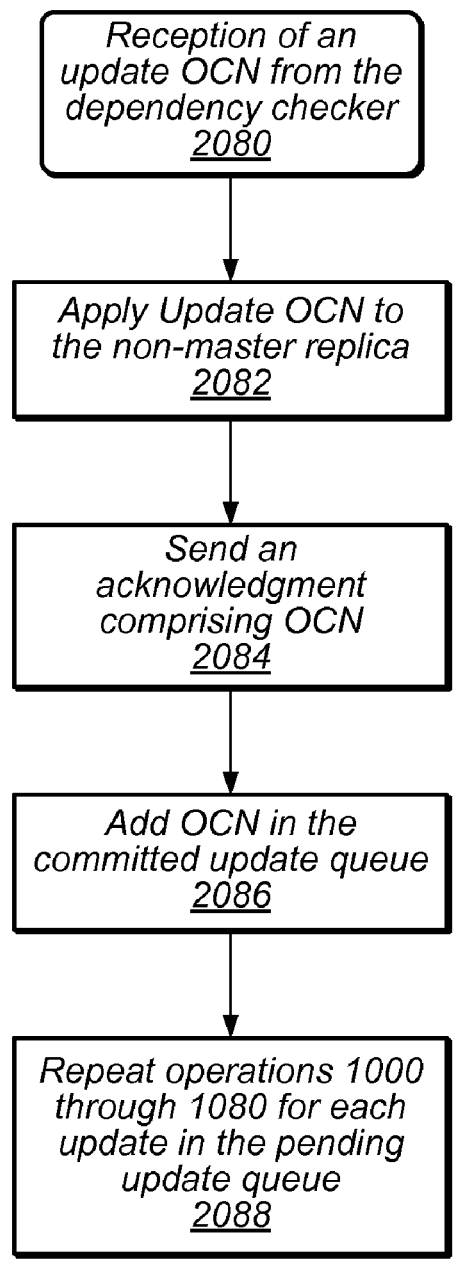
Figure 16:
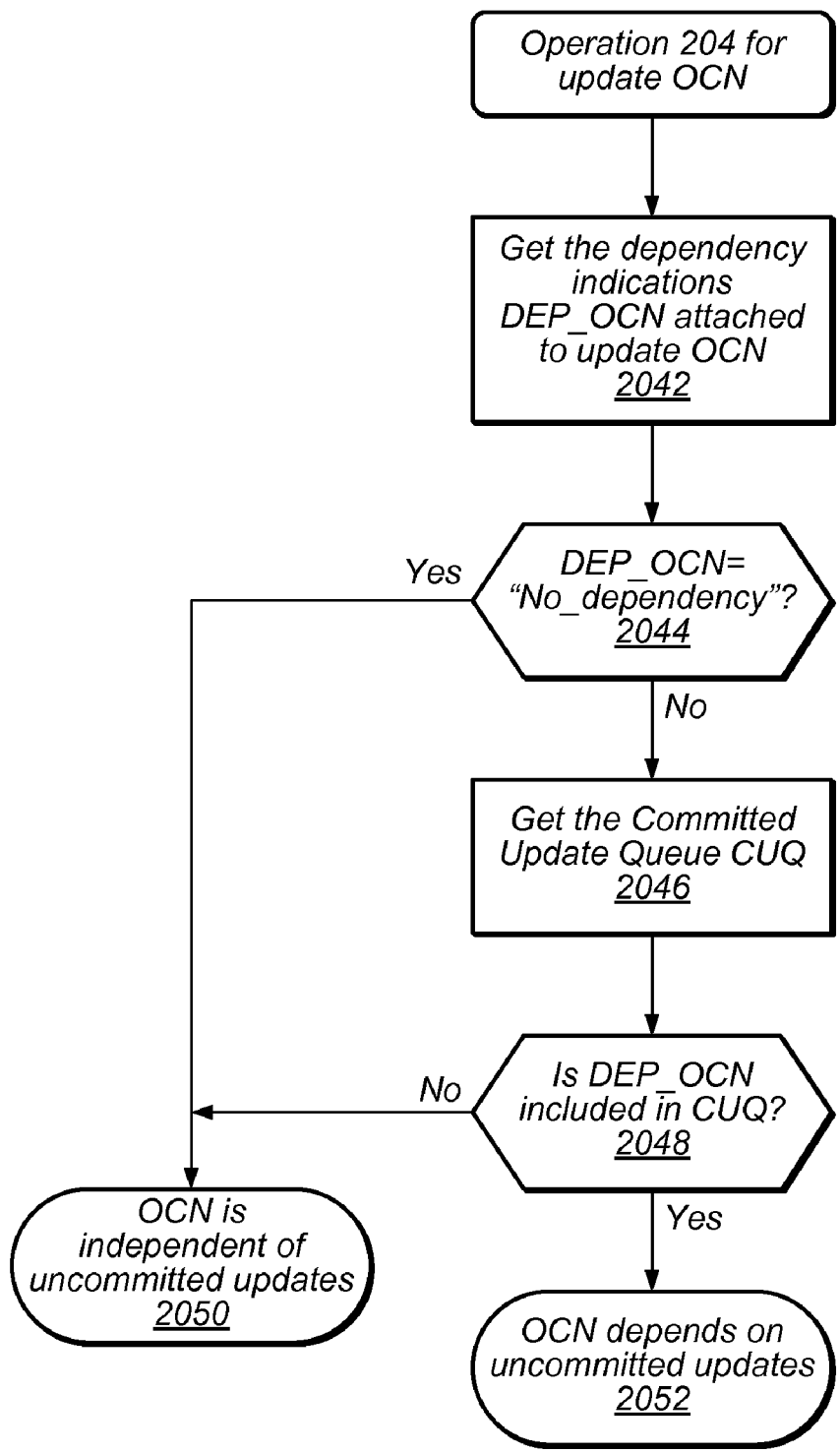
Figure 17:
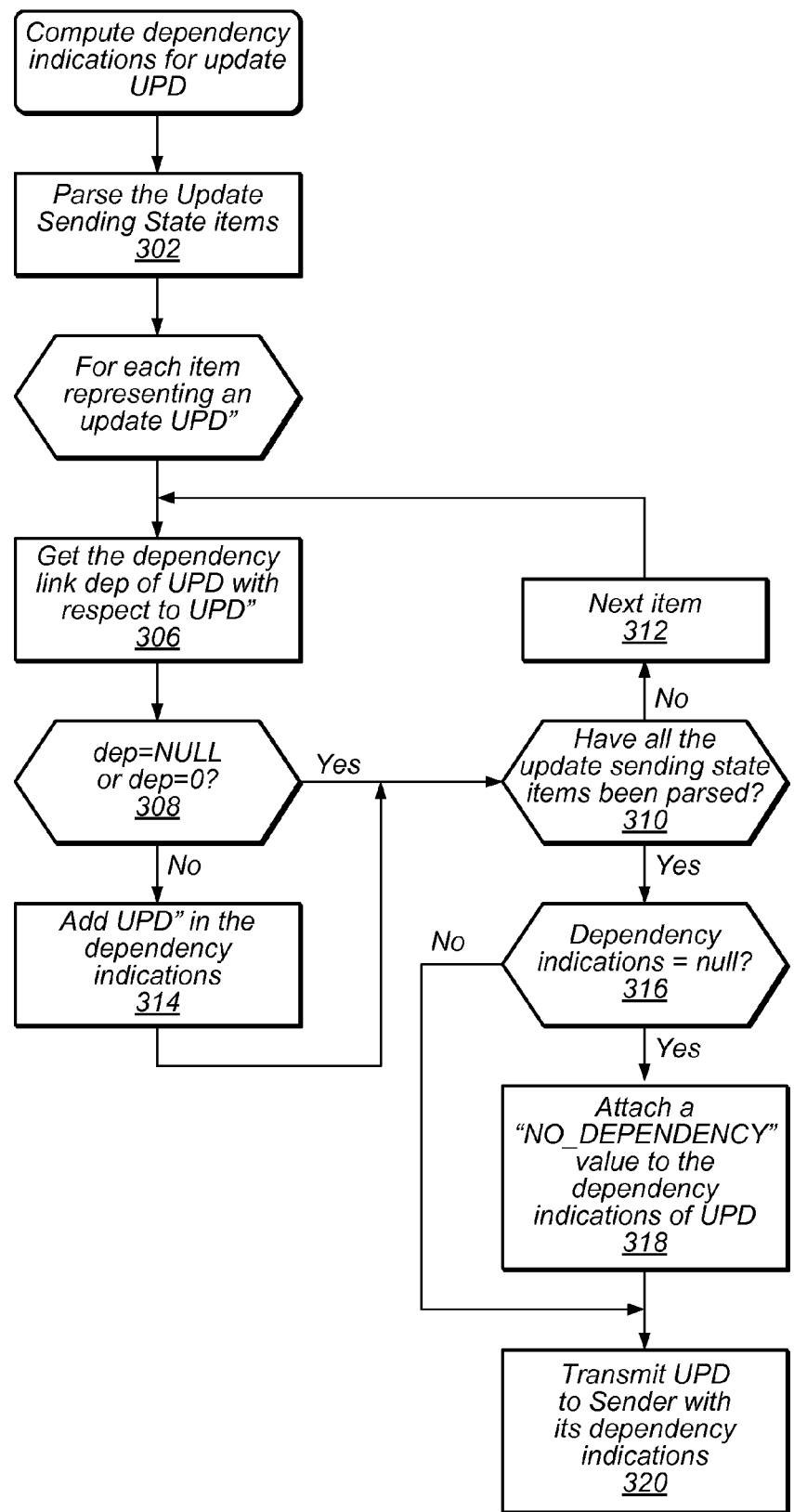
Figure 18:
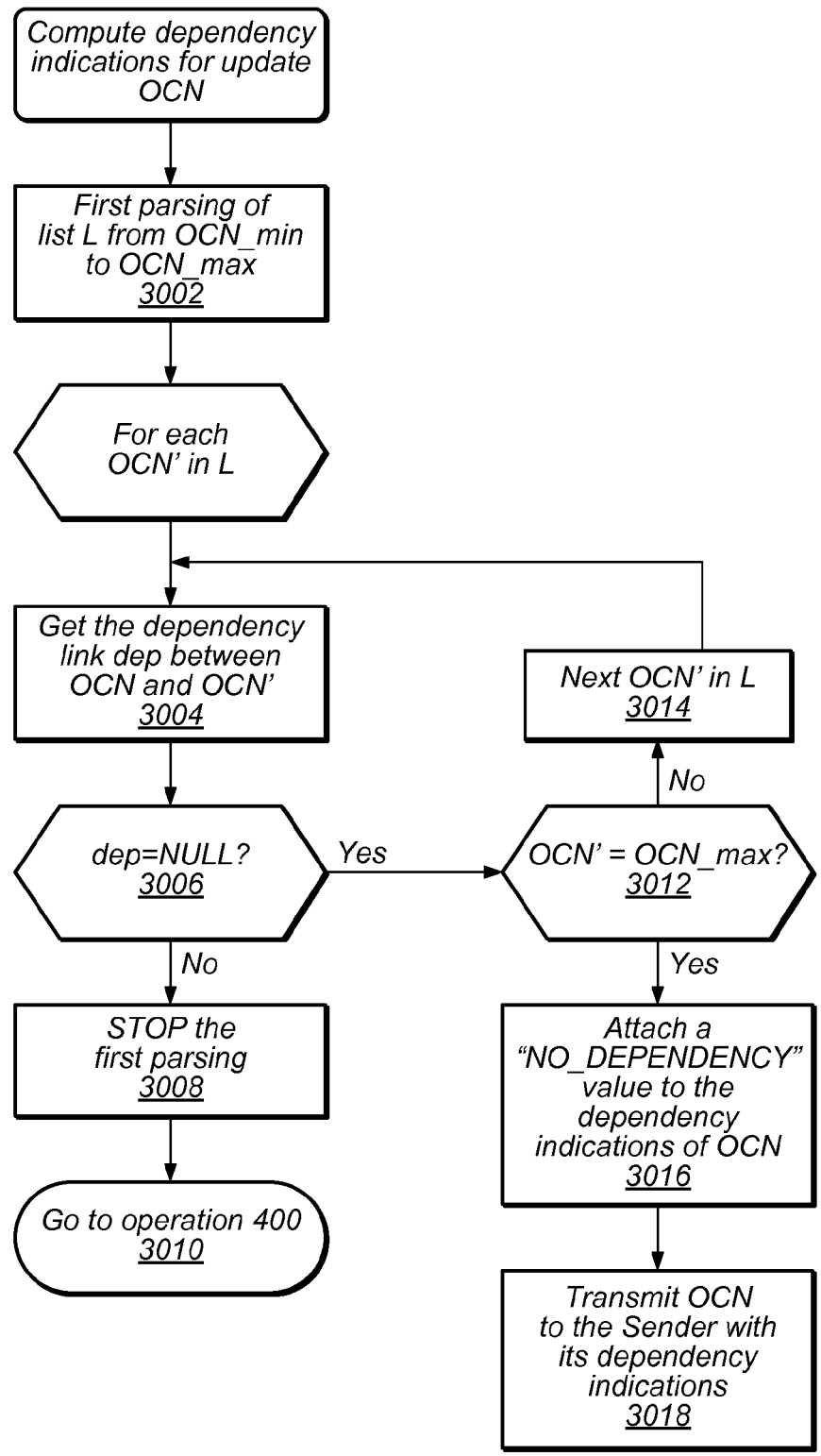
Figure 19:
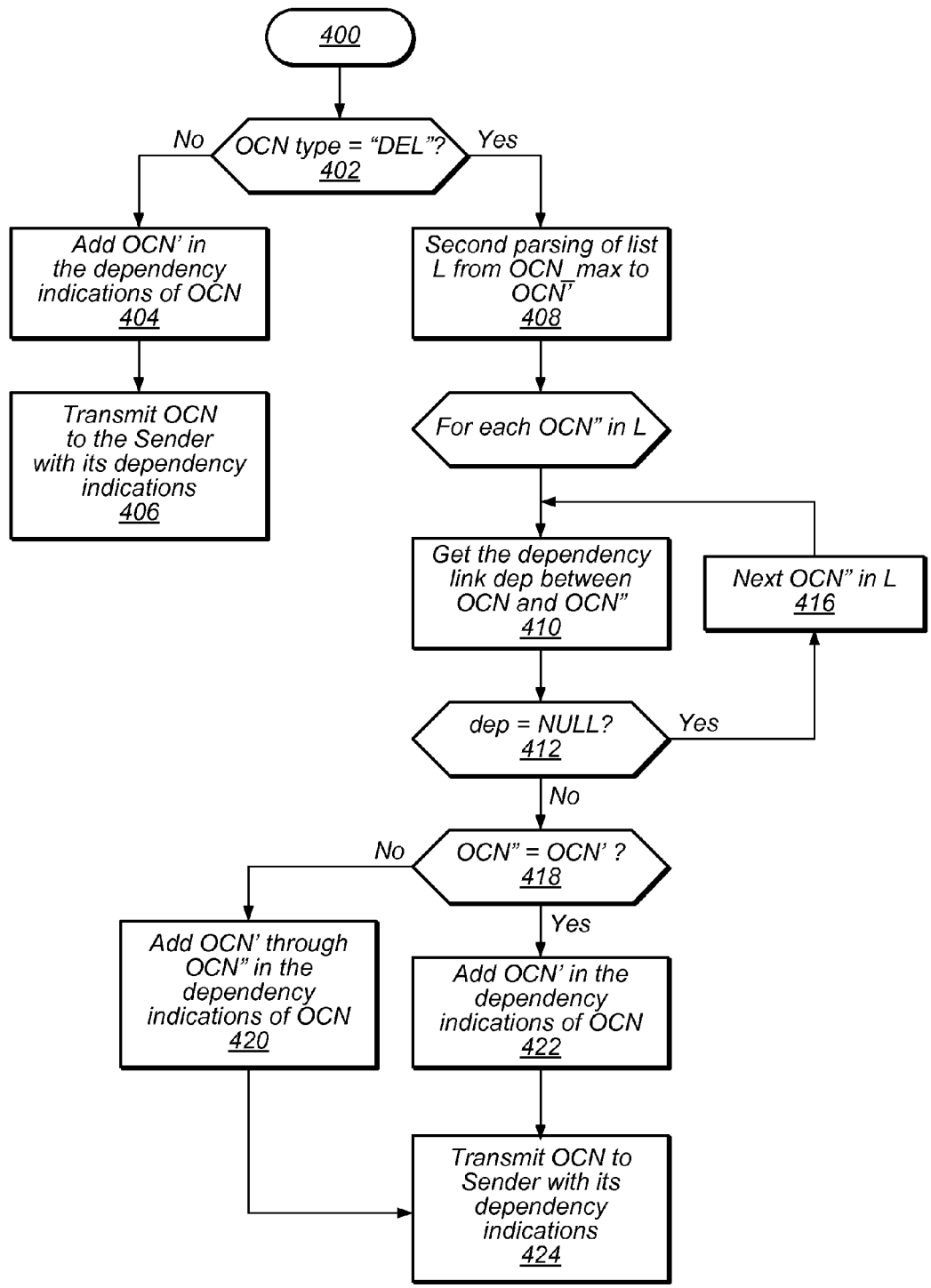

FIG. 7 is a general diagram representing the supplier and consumer structures which are involved in a replication session, according to the prior art, FIG. 8 is a general diagram representing the supplier structures and consumer structures which are involved in a replication session, according to the embodiments of the invention, FIGS. 9 et 10 represent the structure of an update sequence to be sent from the supplier towards the consumer, FIGS. 11 illustrate the selection of an update sequence by the master server, FIGS. 12 et 13 are flowcharts representing the operations performed by the consumer server for replaying updates, according to the embodiments of the invention, FIGS. 14 through 16 are flowcharts representing the operations performed by the consumer server for replaying updates, according to a particular embodiment of the invention, FIG. 17 is a flowchart representing the operations performed by the supplier server for computing dependency indications, according to the embodiments of the invention, and FIGS. 18 and 19 are flowcharts representing the operations performed by the supplier server for replaying updates, according to the particular embodiment of the invention.

Additionally, the detailed description is supplemented with the following Exhibits:
Exhibit A contains an exemplary dependency array according to a particular embodiment of this invention;
Exhibit B contains arrays illustrating the replay of exemplary updates according to the particular embodiment of this invention;

The Exhibits are placed apart from the description, for the purpose of clarifying the detailed description, and of enabling easier reference.

As they may be cited in this specification, Sun, Sun Microsystems and Sun One are trademarks of Sun Microsystems, Inc.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Figure 1:
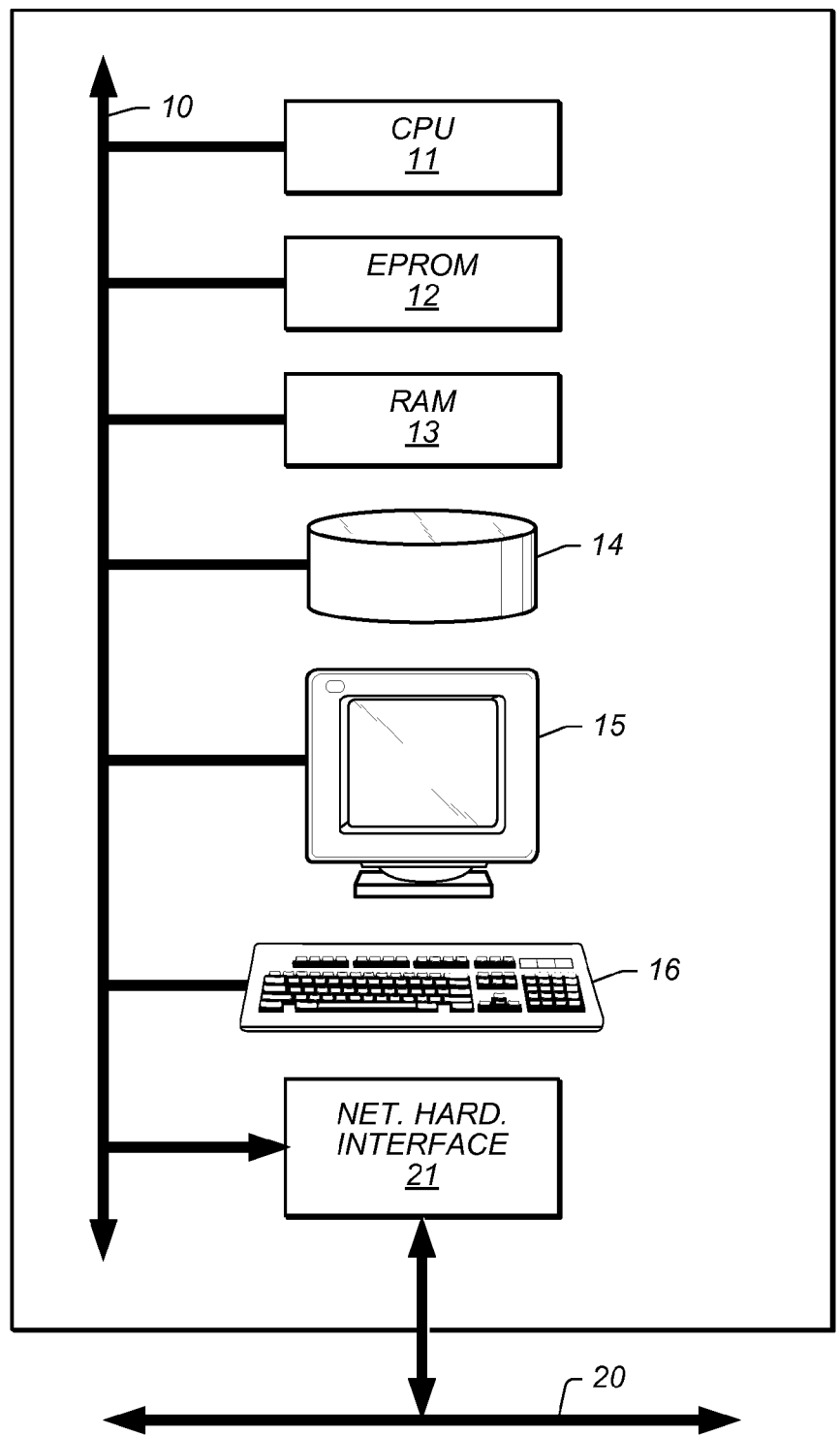
FIG. 1 is a general diagram of a computer system in which the invention is applicable.

This invention may be implemented in a computer system, or in a network comprising computer systems. FIG. 1 represents an example of the hardware of such computer systems. The hardware comprises:
- a processor CPU 11, e.g. an Ultra-Sparc;
- a program memory 12, e.g. an EPROM, a RAM, or Flash memory;
- a working memory 13, e.g. a RAM of any suitable technology;
- a mass memory 14, e.g. one or more hard disks;
- a display 15, e.g. a monitor;
- a user input device 15, e.g. a keyboard and/or a mouse;
- a network interface device 21 connected to a communication medium 20, which is in communication with other computers. Network interface device 21 may be of the type of Ethernet, or of the type of ATM. Medium 20 may be based on wire cables, fiber optics, or radio-communications, for example.

Data may be exchanged between the components of FIG. 1 through a bus system 10, represented as a single bus for simplification of the drawing. Bus systems may include a processor bus, e.g. PCI, connected via appropriate bridges to, e.g. an ISA or a SCSI bus.

The data exchanged are handled by a resource provider using a server to deliver data to user computers, or to store the data provided by the user computers. Browsers, e.g. Internet Explorer, are further provided on user computers, to enable users to make requests, to retrieve or store data. The resource provider makes it possible for user computers on a network to share data of any kind.

iPlanet E-commerce Solutions, now Sun One E-commerce Solutions, has developed a "net-enabling" platform called the Internet Service Deployment Plateform (ISDP). ISDP includes multiple, integrated layers of software that provide a full set of services supporting application development, e.g. business-to-business exchanges, communications and entertainment vehicles, and retail Web sites.

Sun One™ Directory Server, provides a centralized directory service for an intranet or an extranet. A directory service represents a collection of software, hardware, and processes that are able to deliver and store information. The directory service generally includes one or more directory client programs that can access the data stored in the directory, e.g. names, phone numbers or addresses.

Sun One Directory Server is a general purpose directory that stores all information in a single, network-accessible repository. Sun One Directory Server provides the standard protocol LDAP and an application programming interface (API) to access the information contained by the Sun One Directory Server.

Technically, LDAP is defined as on-the-wire bit protocol (similar to HTTP) that runs over Transmission Control Protocol/Internet Protocol (TCP/IP). It specifies the interaction between clients and servers and determines how LDAP queries and responses are carried over the IP network.

Figure 2:
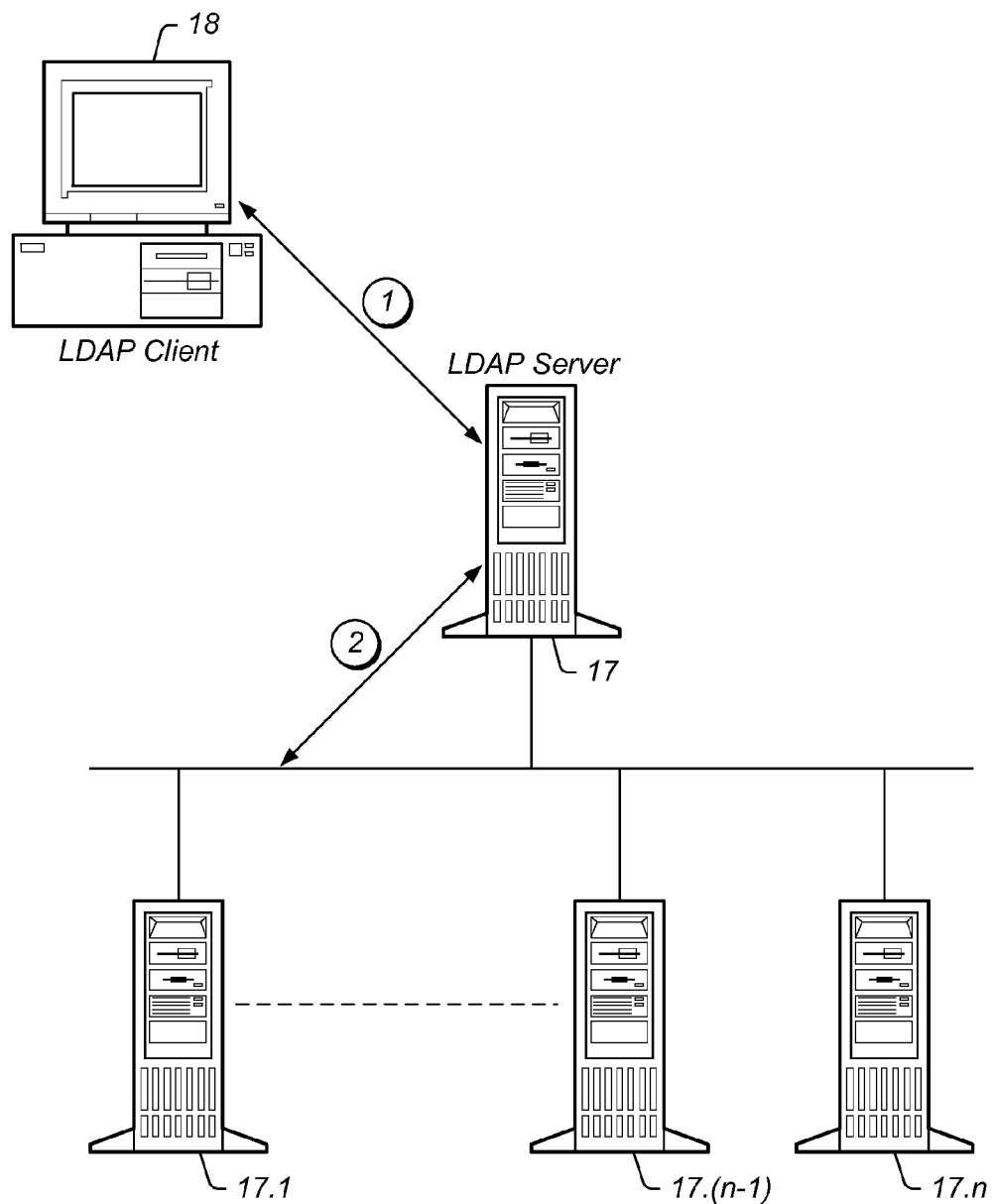
FIG. 2 illustrates a typical LDAP exchange between a LDAP client and LDAP servers.

Referring to FIG. 2, LDAP defines a communication 1 between a server 17 and a client 18. LDAP also defines a communication 2 between LDAP server 17 and servers 17.1 to 17.n, which makes it possible for the server LDAP 17 to exchange its content (replication service) with servers 17.1 to 17.n or to access the directory of one of the servers 17.1 to 17.n (referral service) and vice versa.

The LDAP protocol is a message-oriented protocol. The client 18 constructs an LDAP message containing a request and sends the message to the server 17. The server 17 processes the request and sends a result, or results, back to the client 18 as a series of LDAP messages.

Such a client-server communication additionally lies on a specific architecture. LDAP creates a standard defining the way data are exchanged between the client computer and the directory servers and defining the way data are modeled. More specifically, LDAP relies on four basic models:

an information model;

a naming model;

a functional model; and a security model.

The LDAP information model defines the kind of data that can be stored in a directory. LDAP directory is populated with entries. An entry corresponds to real-world objects, such as a person, a printer, or configuration parameters.

Figure 3:
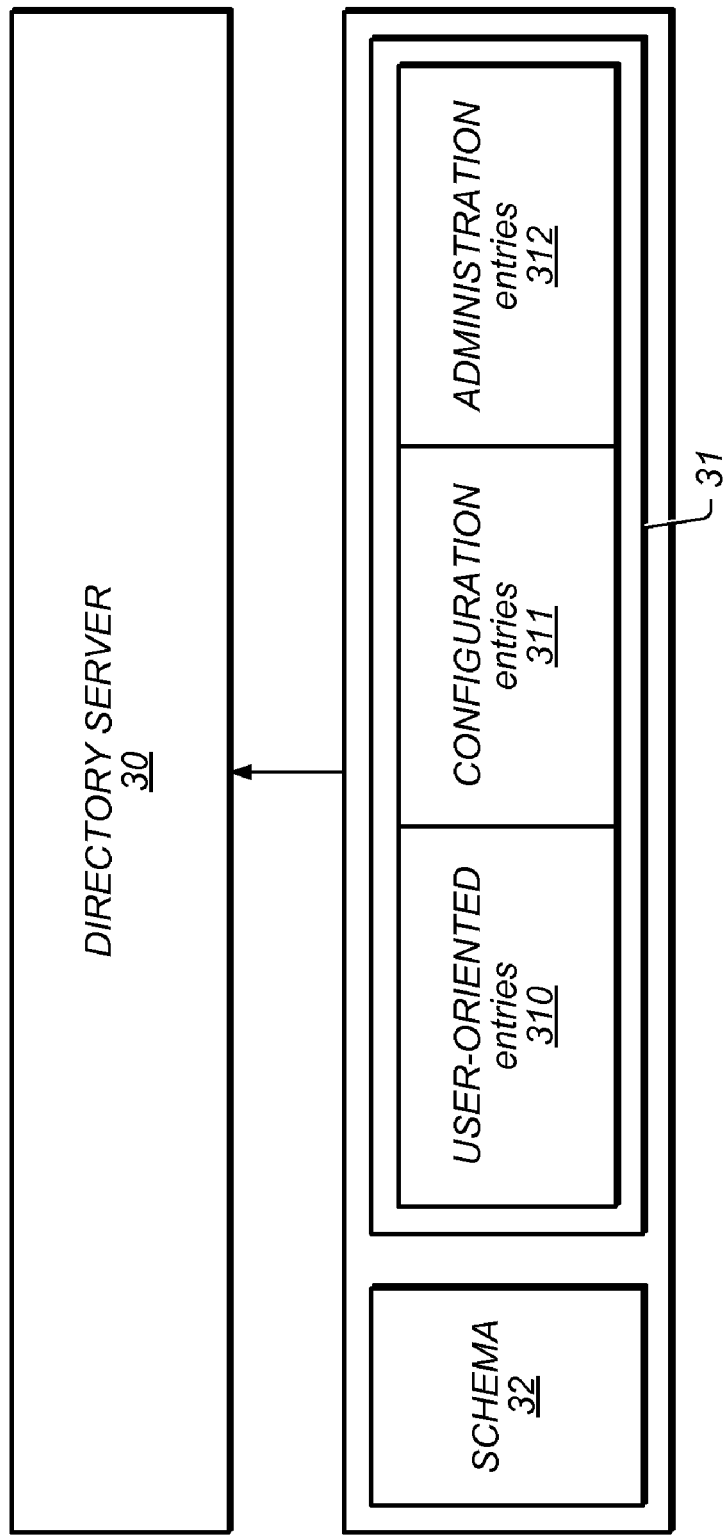
FIG. 3 illustrates the general structure of a LDAP directory.

FIG. 3 illustrates the general structure of a LDAP directory. The directory server 30 executes implemented functions based on the entries 31 stored in databases. The entries comprise configuration entries 310, user entries 311 and administrative entries 312. These entries further interact with the schema 32 described below. The configuration entries are stored under the subtree "cn=config". The user entries comprise data related to the users of the directory server. Administrative entries relate to user management and are generally implemented as LDAP subentries.

An entry contains a set of attributes associated with values. Each entry is uniquely identified by a distinguished name. The distinguished name may be stored in the dn attribute (distinguishedName).

Figure 4:
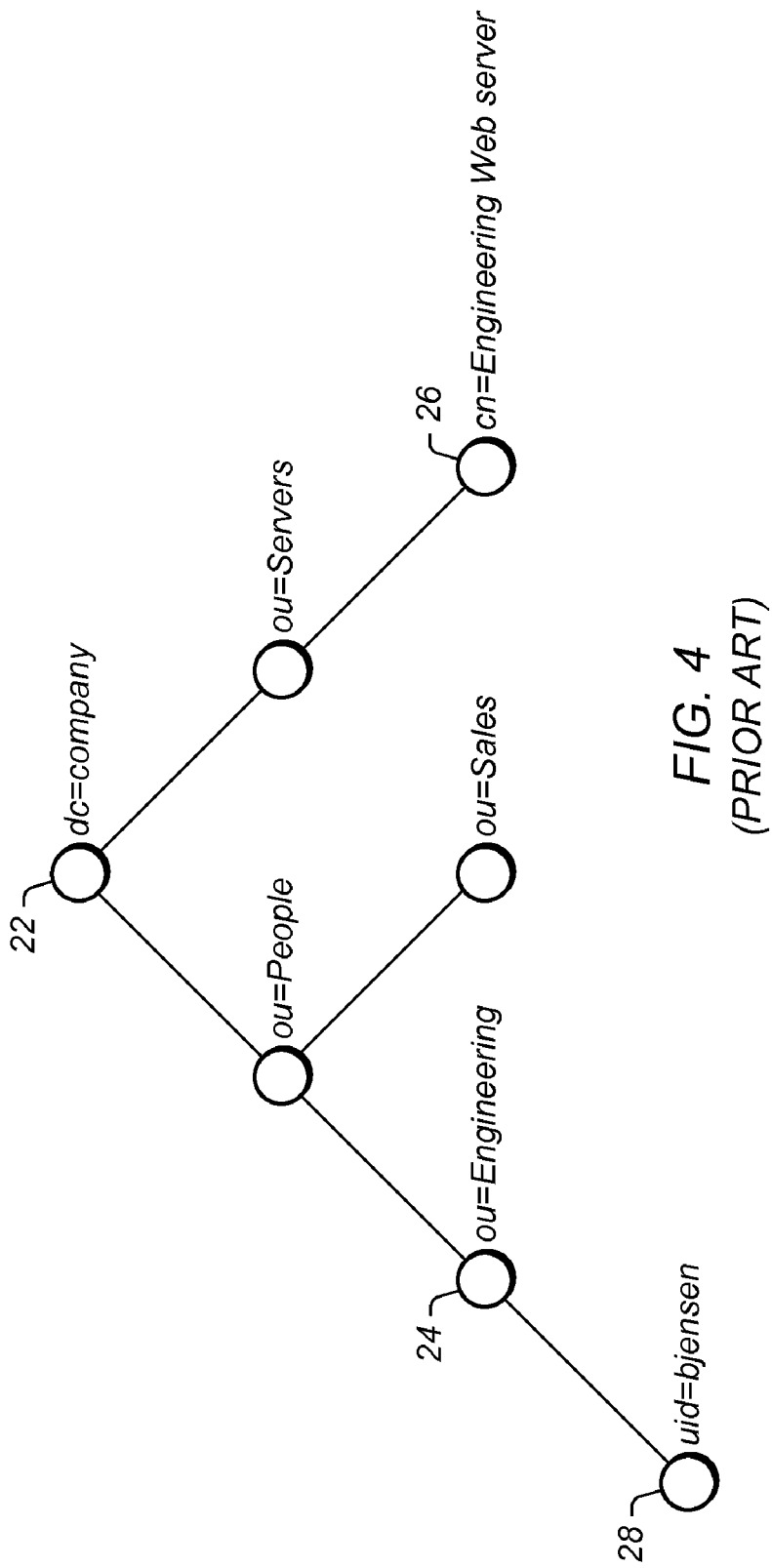
FIG. 4 represents a portion of an exemplary LDAP tree structure.

LDAP entries are organized in a hierarchical tree structure, called the Directory Information Tree (DIT). Each node of the tree comprises an entry. FIG. 4 illustrates an organization entry (22) with the attribute type of domain component dc, an organizational unit entry (24) with the attribute type of organizational unit ou, a server application entry (26) with the attribute type of common name cn, and a person entry (28) with the attribute type of user ID uid. The entries are connected by the directory. Each server has a particular entry called root directory specific entry (rootDSE) which contains the description of the tree and of its content.

Figure 5:
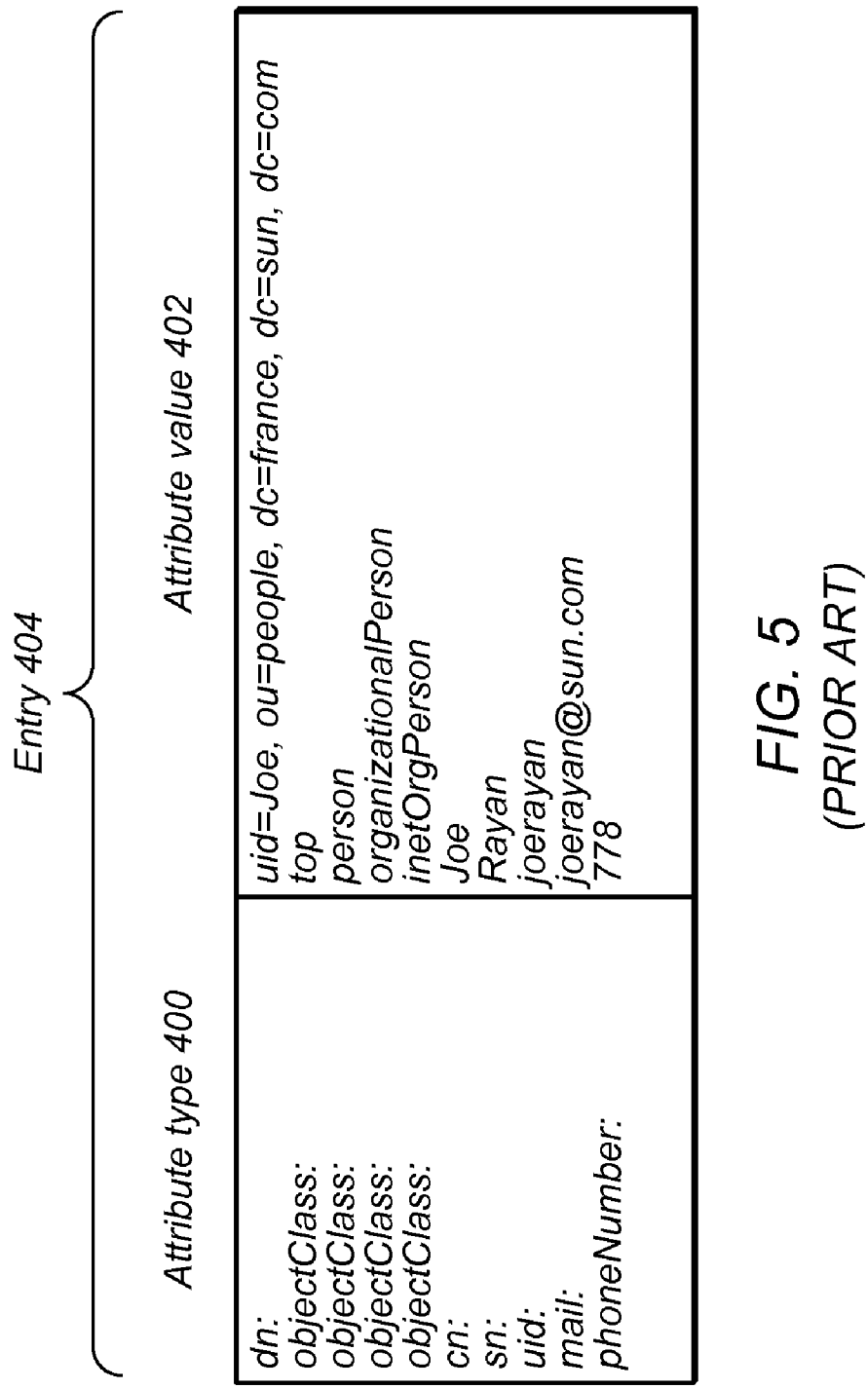
FIG. 5 is an array containing examples of LDAP entry attributes.

The LDAP naming model specifies that directory entries must be hierarchical and organized in an inverted tree structure. As mentioned above, each entry has a unique name called a distinguished name DN. The DN consists of a list of the names of all the parent entries in the directory back to the top of the directory hierarchy, the name of the entry being at the extreme left, e.g., "uid=Joe,ou=people,dc=france, dc=sun,dc=com", in FIG. 5. The root of the entry is at the extreme right of the DN. The name at the extreme left of the DN, "uid=Joe" in the example, is the relative distinguished name or RDN. Within a set of entries sharing the same parents, the RDN must be unique. This ensures that two entries in the directory tree cannot have the same DN.

The LDAP functional model comprises eight basic functional operations that a user from a client computer can perform on the directory data of a LDAP directory server. In particular, the following operations (indicated hereinafter between the quote signs " ")can be made to make changes on the entries:

"add", "delete", and "modify" operations, which apply to make changes on specific entries, and "modifyRDN" operation, which applies to change the distinguished name DN of an entry.

LDAP also provides a replication mechanism to increase the availability and performance of the directory.

Replication allows the same information to exist on more than one server. Each server in a directory server system interacts with a database in which directory server data are maintained. A database which participates in replication form a replica.

A replica can be either a read-write replica or a read-only replica. A read-write replica contains master copies of directory information and can be updated. A read-only replica refers all update operations to read-write replicas. A server can hold any number of read-only or read-write replicas.

A master server holds a read-write replica which is copied to a replica on a different server. A non-master server or slave server holds a read-only replica which is copied from a master server.

A replication session may not only occur between a master server and a slave server but also between two master servers, in certain network topologies.

In a replication session among two servers, the server which holds a replica that is copied to a replica on the other server is called a supplier for that replica and the server that holds a replica that is copied from the other server is called a consumer for that replica.

More specifically, replication is a process by which updates performed by a master server are propagated to all the replicas. A master server can replicate an entire naming context, a subtree, or a particular entry. A master server can also replicate the entire content of an entry, or a subset of attributes to be replicated.

Replication significantly reduces the load of processing requests generated by directory service clients because several servers share the same information, and has the following advantages:

It reduces the load on a master server by diverting some traffic to other servers;

It allows to store copies of data where they are most frequently used, reducing network traffic; and It allows to store many copies of the data.

Sun One™ Directory Server system supports multi-master replication topology in which master copies of the same information can exist on several servers or master servers.

A LDAP multi-master topology is a set of LDAP servers fully or partially meshed among them that collaborate to offer a logically global view to external clients. An external client can launch an update request to any master server of the multi-master topology.

The updates that are locally performed on a master server are then replicated to the other master servers. Therefore, in multi-master topology, a master server can be a supplier or a consumer server. A Supplier server is the source of the updates to be transferred. A Consumer server is the recipient of the updates.

A master server also replicates updates to several slave servers which maintain a read-only replica. Slave servers are only consumer servers.

Figure 6A:
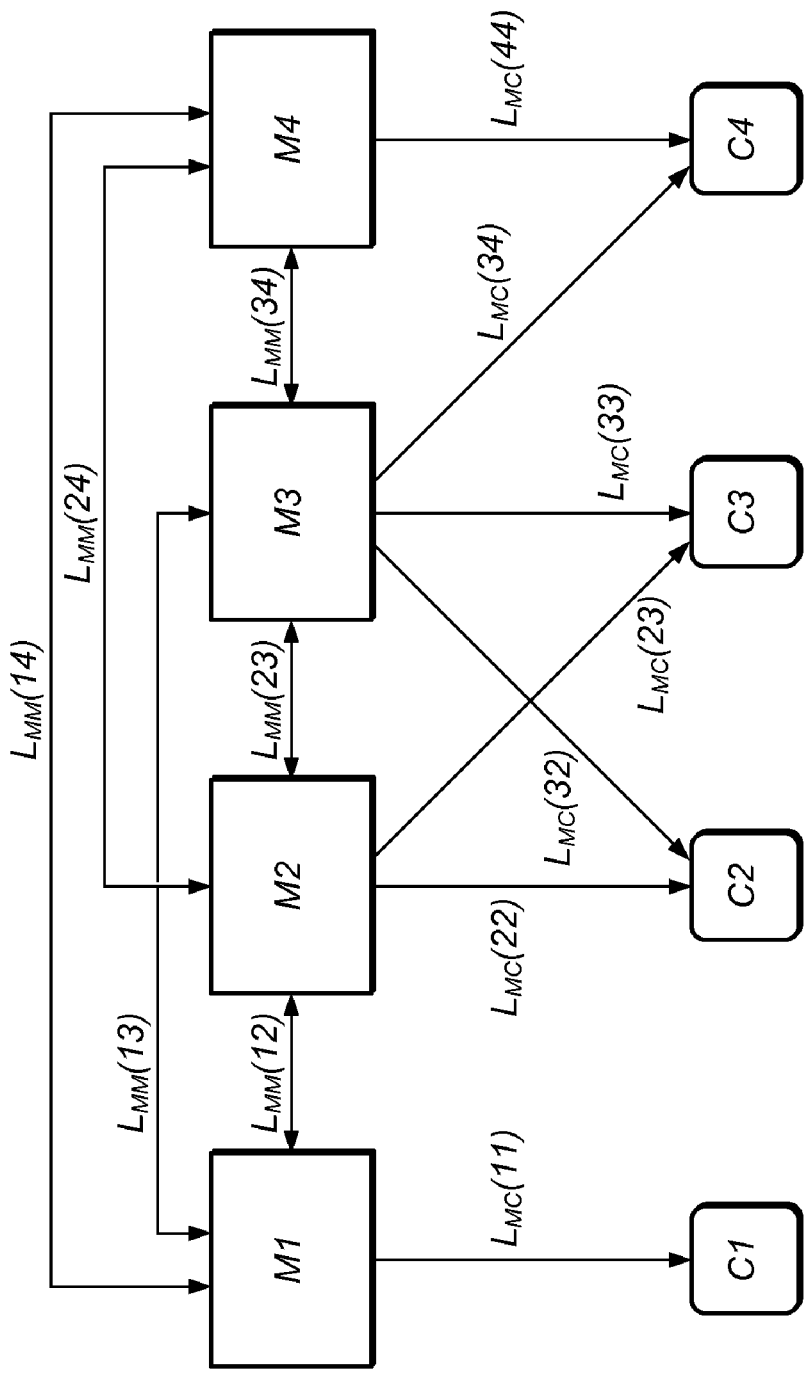
FIG. 6a illustrates the general structure of a multi-master directory system.

FIG. 6a shows an example of a directory server system having a multi-master topology. Such a directory server system comprises several master servers and slave servers. Each server of the multi-master topology stores a replica.

The multi-master topology of FIG. 6a comprises four master servers M1, M2, M3 and M4 which maintain a read-write replica and four slave servers C1, C2, C3 and C4 which maintain a read-only replica.

Each master server M1, M2, M3 or M4 can exchange updates with another master server, and can send replicate updates to slave servers C1, C2, C3 or C4 which are connected thereto.

If one master is unreachable for some period of time—due to hardware failure, software failure or network failure—the other master servers continue to accept updates and can replicate the updates to the read-only replicas.

Replication relationships, e.g., $L_{MC(11)}$, $L_{MC(22)}$, $L_{MC(23)}$, $L_{MC(31)}$, $L_{MC(33)}$, $L_{MC(34)}$ and $L_{MC(44)}$, may be established between the master servers M1, M2, M3, and M4 and the slave servers C1, C2, C3 and C4. $L_{MC(Ik)}$ designates a unidirectional replication relationship from master M1 to slave server Ck.

Each master server is capable of responding to read requests and update requests from a directory client. Upon receiving an update request form a client, it accordingly modifies an entry and then records the updates made in an update log or replication log.

Each master server may interact with the other master servers to replicate the updates made to its replica. Thus, as seen on FIG. 6a, master server M1 may interact with all the other masters M2, M3 and M4 in order to replicate updates. Master server M1 would be acting in this case as a supplier server for the other master servers.

A master server may also receive replication updates from the other master servers, thus playing the role of consumer.

Therefore, replication Relationships, e.g. $L_{MM(12)}$, $L_{MM(23)}$, $L_{MM(34)}$, $L_{MM(14)}$, $L_{MM(13)}$, and $L_{MM(24)}$, may be established between the master servers M1, M2, M3, and M4.

$L_{MM(Ik)}$ designates a bidirectional relationship between master server M1 and master server Mk.

As a result, a given master server has a knowledge of the updates performed on the other master servers.

Replicate updates may comprise "add", "delete", "modify", and "modifyRDN" operations.

An "add" operation has a dn parameter which represents the distinguished name DN of the entry to add in the DIT, and a modlist parameter which represents a list of attributes to be added to that entry. The parent entry of the entry dn must exist.

In the foregoing description, an entry that is identified by a distinguished name dn may be designated as "entry dn" to enable easier the reference.

A "delete" or "del" operation has a dn parameter which represents the distinguished name DN of the entry to delete. To be successful, this operation requires the entry dn to be a leave entry in the DIT.

A "modify" or "mod" operation has a dn parameter which represents the distinguished name DN of the entry to modify and a modlist parameter which represents a list of modifications to made to the attributes of that entry. Each element in the modlist may be in the form of (mod_op, mod_type, mod_vals), where mod_op is a string indicating the operation ("add", "delete" or "replace"), mod_type indicates the attribute type name and mod_vals represents a value or a list of values to add, delete or replace respectively.

A "modifyRDN" or "modRDN" operation has a dn parameter which represents the distinguished name DN of the entry whose DN is to be changed and a newdn parameter which represents the new distinguished name to give to the entry. To be successful, this operation requires the entry dn to be a leave entry in the DIT and the parent entry newDN to exist.

In the prior art, master servers can sustain a very high rate of updates from clients. More specifically each master server:

may receive client updates from multiple connections, may apply these client updates simultaneously by taking advantage of the multithreading capacities of the host system.

However, in the prior art, a consumer server has to replay the updates received from a master server in the same order as they were initially applied by the supplier server, in such a way that:

a single connection is used by the master server to replicate updates toward the slave server, only one change is replayed at a time by the slave server, thus not taking advantage of the consumer host system resource.

Indeed, the consumer server cannot take advantage of the multithreading capabilities of the host system as a consumer receives an update together with time data which were generated by the master server that originally performed that update. Such time data have to be respected by the consumer server upon replaying the updates in order to properly apply the conflict resolution procedures.

Therefore, by sending the updates toward a slave server in the order they were applied by the master server and by replaying these updates according to that order, this ensures that no update dependency conflicts will happen in the non-master server.

An update dependency conflict would occur in a slave server upon replaying an update that depends on another update that has not yet been replayed.

A dependency is defined for a first update with respect to a second update which has been locally applied in the master server before the first update. Therefore, dependencies are linked to the initial ordering of the updates in the master server.

Update dependencies stem from the operation types of the updates. In a directory having a tree structure, such as LDAP, Update dependencies are also related to the distinguished names of the entries on which the operations applies.

An example of dependency is that an "add" operation on an entry dn1 depends on a previous "add" operation on an entry dn2, if the entry dn2 is an ancestor of entry dn1, as it is impossible to add an entry to a parent entry that does not exist.

However, a given update is not necessarily dependent on the updates which have been originally applied in the master server before it. For instance, a "delete" operation on an entry dn1 is independent of a previous "delete" operation on an entry identified by dn3, if entry dn3 has the same parent as entry dn1.

In the foregoing description, an operation on an entry identified by a distinguished name dn will be designated either by "op(dn)", where op may be an "add", "del" or "mod" operation or by "op(dn→dn')", where op is a "modRDN" operation that replaces dn with dn'.

In the prior art, such dependency conflicts are resolved in a replication session between a master server and a slave server both by:
  causing the master server to successively send updates in the order they were applied and to send a given update only if the previously sent update has been replayed by the slave server; the master server is informed that the previously sent update has been replayed by a replay acknowledgment sent by the slave server;
  causing the slave server to replay the updates received from a master server in the order they were applied in that master server, and therefore by causing the slave server to replay only one update at a time, without taking advantage of the multithreading resource of the host system.

The present invention proposes to improve replay performances on the consumer side by exploiting dependencies between updates.

In the multi-master topologies of the prior art, a replication session occurs between a supplier and consumer over a connection. In particular, a replication session occurs between a master server acting as a supplier and a slave server acting as a consumer.

The detailed description will be made hereinafter in reference to a replication session between a master server and a slave server. Therefore, the expressions "supplier" or "supplier server" will designate a master server and the expressions "consumer" or "consumer server" will designate a slave server.

The replication session may be initiated by the supplier, in which case the supplier starts the replication session by opening a connection to the consumer. The supplier binds using the authentication credentials provided in a replication agreement.

The consumer does not support multiple concurrent replication sessions with more than one supplier. A supplier which attempts to initiate a replication session with a consumer that is already participating to another replication session may receive an appropriate error.

The update transfer protocol defines the operations the supplier should perform to initialize a replication session.

Figure 6B:
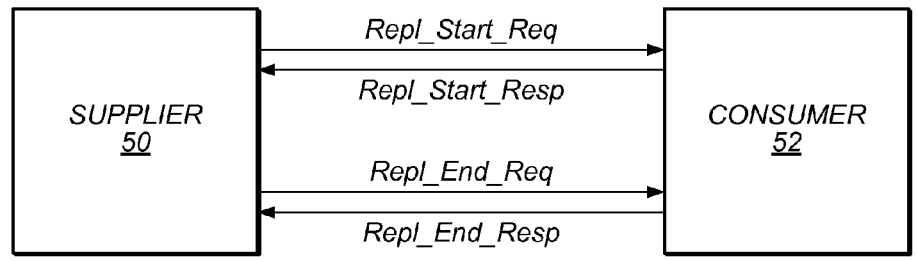
FIG. 6b illustrates a replication session between a supplier and a consumer.

A supplier-initiated replication session will be described below, in reference to FIG. 6b.

The supplier 50 initiates a replication session with a consumer 52 connected thereto by sending a replication start request Repl_start_Req to the consumer. The parameters of the replication start request identify the replication agreement associated with the session, the update transfer protocol associated with the replication session, and other state information required to initiate the replication session.

The consumer 52 then sends back a replication start response Replstart_Resp to the supplier 50. The parameters of the replication start response include a response code, and an optional update vector.

Afterwards, the supplier sends selected updates through a number of request/response exchanges with the consumer. The update transfer protocol defines the mechanisms for the consumer to receive selected updates based on the current state of replication represented in an update vector.

Upon sending all the selected updates to the consumer, the supplier 50 sends a replication end request Repl_end_Req to the consumer 52.

In return, the consumer 52 sends back a replication end response Repl_end_Resp to the supplier 50.

The purpose of the replication end request and the replication end response is to secure the state of the update vectors associated with the two replicas which participate to replication.

Upon terminating a replication session, the supplier 50 can either start a new replication session or release its binding to the consumer 52.

Each master server may receive updates from clients and from other master servers connected thereto. As a result, the updates applied in the master replica comprise:
  original updates, which have been locally created in the master server in response to a client update request, and
  updates performed in the master server upon receipt of replicate updates from other master server connected thereto.

Each original update applied in a master replica is attached a Change Sequence Number CSN uniquely identifying the update. A CSN value is generated for each update made to an entry at the master server at which the update was created and is propagated with the associated update data toward the other servers, upon replication.

In particular, a CSN value is formed of three components:
  a creation time or time indication, representing the time at which the update was locally created,
  a change count, and
  a Replica Identifier.

An additional reserved field may be provided.

Such CSN composition ensures the uniqueness of every generated CSN. When CSNs are to be compared to determine their ordering, they are compared component by component: first the time indication, then the change count, then the replica identifier and finally the above mentioned reserved field, when provided.

The time indication may be a year-2000-safe representation of the real world time, with a granularity of one second and indicates the time at which the update was locally created.

Because many updates, at a single replica, may be applied to the same data in a single second, the change count component of the CSN may be provided to further order the updates.

Each replica maintains a change count of the updates applied against it. The change count is reset to zero at the start of each second, and is increasing within that second, incremented for each and every update.

If updates occur at different replicas to the same data, within the same single second, and happen to be assigned the same change count number, then the Replica Identifier is used to further order the changes. The Replica Identifier is a unique identifier of a particular replica in the whole topology.

The above mentioned reserved field may be used as a modification number for ordering the LDAP update operations (e.g. "add", "delete") that are produced in the topology.

Therefore, a change sequence number ensures that:
two different master servers cannot create the same CSN, and
the CSN grows in time globally in the whole topology.

A replication log may be maintained by each master server for storing a history of the updates applied in its replica.

A replication log is a record that describes the modifications that have occurred on a replica. When an entry is modified, a change record describing the update that was performed, e.g., a LDAP operation, is recorded in the replication log. A replication log is ordered according to the CSNs attached to the updates.

The supplier may use the consumer update vector received from the consumer to determine the sequence of updates that should be sent to the consumer. Each server maintains an update vector to record the point to which the replica has been updated.

An update vector represents a set of CSN values, each value representing a respective master replica, among the master replicas of the topology. In particular, each CSN value in the update vector corresponds to the most recent update known locally that occurred in the master replica where this CSN value was originated.

FIG. 7 shows a functional diagram representing a replication session between a supplier 50 and a consumer 52. The supplier database 504 comprises the master replica and interacts with the replication log 502 for storing a history of the update applied therein.

The updates are stored in the replication log 502 in the form of update primitives, each defining an update made to the master replica. Each update primitive comprises sufficient data to allow recreation of corresponding state change on the consumer replica (in particular the operation type of the update, the DN of the entry on which the operation applies, and other operation arguments) and a CSN identifying the original update. The replication log is ordered from the earliest to the latest CSN values.

The supplier 50 selects the updates to send from the replication log 502 and transmits them to a synchronous sender 500, in the order they were retrieved. Upon receiving the selected updates, the synchronous sender 500 sends a replication update request to the consumer for starting the update transfer.

The sender 500 successively sends the selected updates, according to the replication log order, i.e. from the earliest selected update to the latest selected update.

On sending an update UPD_N to the consumer 52, the sender 500 waits for a replay acknowledgment from the consumer 52 before sending the next update UPD_N+1. More specifically, the consumer 52 has an update application function or replay function 522 capable of replaying update UPD_N received from the supplier in the consumer database 520 and upon replaying update UPD_N, of sending back a replay acknowledgment ACK_N to the synchronous sender 500.

The synchronous sender 500 will send the next selected update UPD_N+1 only after the receipt of that acknowledgment ACK_N.

The update transfer from the supplier toward the consumer goes on in this way until all the selected updates are sent.

The fact that the supplier waits for an acknowledgment ACK_N, indicating that update UPD_N has been replayed, before sending update UPD_N+1 ensures that the consumer replays the updates in the order they were retrieved from the supplier replication log, i.e in the order they were applied by the master server. Therefore, in the prior art the update transfer is required to be synchronous and the update replay on the consumer side is required to be serial. As a result, replay performances are not optimized even if dependency conflicts are avoided.

The directory server system and the method according to the invention make it possible to optimize those update performances. Particularly, the directory server system and the method according to the invention make it possible for the consumer to replay multiple updates simultaneously while keeping consistency.

FIG. 8 is a functional diagram representing a replication session between a master server 510, acting as a supplier, and a slave server 512, acting as a consumer, in a directory server system according to the invention.

Like in the prior art, the master server determines the sequence of updates that the consumer needs to be sent, from the consumer update vector and then selects this sequence of updates. The master server may select this sequence of updates in the replication log 502, which contains a history of the updates applied in the master replica 504, in order to transmit them to an asynchronous sender 5000.

The asynchronous sender 5000 is arranged to successively send the updates in the replication log order. According to the embodiments of the invention, the asynchronous sender 5000 sends each selected update without caring about the replay of the previously sent update, on the consumer side.

Thus, for example, after sending the update UPD_N to the consumer, the sender 5000 will send the next update UPD_N+1 even if acknowledgment ACK_N has not yet been received from the consumer.

According to the embodiments of the invention, the consumer 512 will be able to replay a given selected update:
  if this update is independent of other updates among the selected updates, or
  if this update depends on other updates among the selected updates and if these other updates have been already replayed.

Accordingly, the consumer 512 comprises a dependency checker 5002 for determining whether each update UPD received from the master server 510 depends on other updates {UPD'}, and if not for transmitting the update UPD to the update replay function 5220.

The update replay function 5220 is operable for applying or replaying the updates received from the dependency checker in the consumer replica. The dependency checker 5224 may process multiple updates at the same time, and as well the update replay function 5220 may replay simultaneously multiple updates, thus taking advantage of the multithreading capabilities of the host system.

The dependency checker 5224 is further capable of storing an update UPD in pending update items 5228, if that update depends on other updates {UPD'} and if at least one of these other updates has not yet been replayed in the consumer replica.

In this case, update UPD is stored in the pending update items 5228 until all the other updates {UPD'} on which UPD depends are replayed. Once all the other updates {UPD'} have been replayed, update UPD is retrieved from the pending update items 5228 and transmitted to the update replay function 5220.

The dependency checker may also interact with committed update items 5226 which represent the updates that have been already replayed among the selected updates.

FIG. 12 represents the operations performed by the dependency checker on the consumer side for replaying the updates received from the master server, according to the embodiments of the invention. It would be understood that the operations of FIG. 12 may be performed in parallel by several dependency checker threads.

Upon receiving a selected update UPD from the master server at step 100, the dependency checker performs operation 102 for determining whether update UPD depends on other updates {UPD'} among the updates selected by the master server and if not, the consumer sends update UPD to the replay function at operation 108.

If update UPD depends on other updates {UPD'}, the dependency checker further performs operation 104 to determine whether all the other updates {UPD'} on which update UPD depends have been applied. If the updates {UPD'} have all been applied, the dependency checker sends update UPD to the update replay function at operation 108. Otherwise, update UPD is stored in the pending update items, at operation 106.

Then the dependency checker determines if all the selected updates have been processed and if not processes the other selected updates it has received at operation 110.

Figure 13:
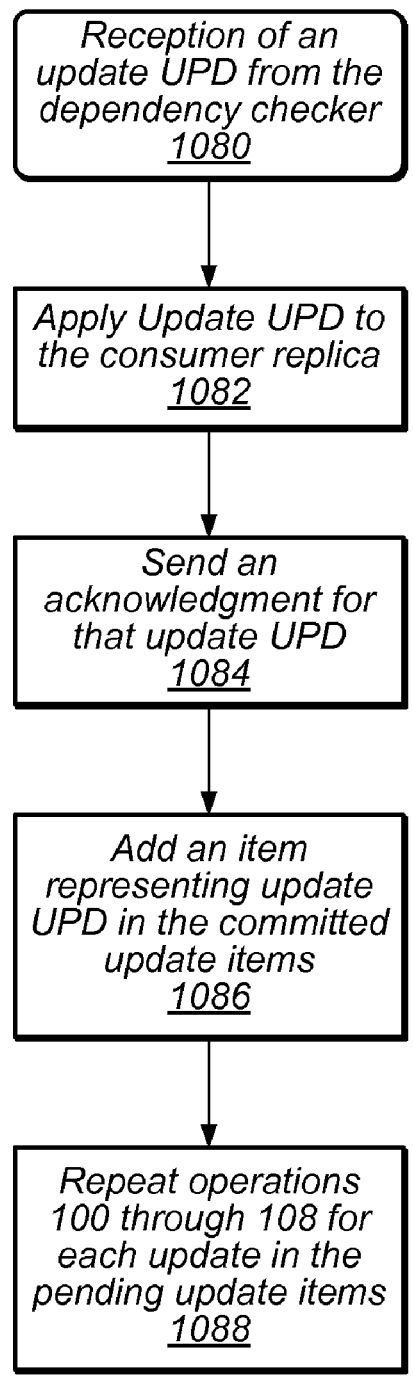

FIG. 13 represents the operations performed by the replay function in the consumer. The operations of the flowchart of FIG. 13 may be performed by multiple threads, if several updates are received by the replay function.

Upon receiving an update UPD from the dependency checker at step 1080, the replay function applies update UPD to the consumer replica at operation 1082.

The replay function sends afterwards an acknowledgment for that update UPD to the master server to indicate that the update has been replayed.

The replay function may then mark update UPD as committed in the committed update items at operation 1086.

Furthermore, if the pending update items contained an update UPD" which depends only on update UPD or which depends on update UPD and on further updates that have been already replayed, this pending update UPD" could also be replayed now. That is why, the replay function finally repeats operations 102 through 108 for each update represented in the pending update items at operation 1088.

Turning back to FIG. 8, the master server may have a dependency builder 5002 for computing dependency indications for an update UPD to be sent to the consumer, each dependency indication being associated to another update UPD' on which update UPD depends.

The dependency builder may interact with a two input array or dependency array for computing the dependency indications. The dependency array is filled according to predefined dependency links between the existing operation types. Upon receipt of a first update at a first input and of a second update at a second input, this dependency array may provide the dependency link of the first update with respect to the second update.

An exemplary dependency array is represented in Exhibit A, for use in a LDAP directory server system. In this array, dn represents the DN of a given entry, dn' the DN of the parent entry of entry dn, dn" the DN of a child entry of entry dn, and dn1 and dn2 the DN of other entries distinct from the entries dn, dn' and dn".

The dependency array of Exhibit A indicates that:
any add(dn) operation depends on:
  any previous add(dn'), del(dn') and modRDN(dn'→dn1) operation,
  any previous modRDN(dn1→dn'),
  any previous add(dn),
  any previous del(dn).

any del(dn) operation depends on:
  any previous add(dn'), del(dn') and modRDN(dn'→dn1) operation,
  any previous modRDN(dn1→dn) operation,
  any previous add(dn) operation,
  any previous del(dn") operation.
any mod(dn) operation depends on:
  any previous add(dn) operation,
  any previous del(dn) operation, and
  any previous modRDN(dn→dn1) operation.
any mod(dn→dn1) operation depends on:
  any previous add(dn'), del(dn') and modRDN(dn'→dn2) operation,
  any previous modRDN(dn1→dn) operation,
  any previous add(dn) operation,
  any previous del(dn) operation,
  any previous modRDN(dn2→dn) operation.

This dependency array provides the dependency link for a first update comprising one of the operation types in the first raw, with respect to a second update comprising one of the operation types in the first column.

The first input of the dependency array is to receive an update for which it is desired to compute dependencies and the second input of the dependency array is to receive an update, among the selected updates on which the update of the first input is likely to depend. For example, the second input of the dependency array is to receive an update among the selected updates which have been previously sent as will be described later.

In the example of exhibit A, the update received at the first input is compared with the update types stored in the first raw of the dependency array and the update received at the second input is compared with the update types stored in the first column of the dependency array. The dependency array may then determine the dependency value attached to the couple that match the update at the first input and the update at the second input. By way of example, a value "0" is chosen herein to indicate that a given update in the first raw does not depend on an update in the first column and a value "1" to indicate that a given update in the first raw depends on an update in the first column. For instance if the update "add(dn)" is entered at the first input of the dependency array and if the previous "del (dn')" is entered at the second input, dn' being the DN of the parent entry of entry dn, the dependency array will provide the dependency value 1.

As, in the first column, only the updates which cause dependency for one of the possible updates in the first raw are represented in the dependency array, the dependency array may found no couple matching the update of the first input and the update of the second input and may therefore find no dependency value in the dependency array. This will be interpreted as equivalent to a value 0.

The dependency builder 5002 may also interact with update sending state items maintained by the master server to select the updates to enter at the second input of the dependency array.

Each item in the update sending state items represents an update among the selected updates which have been previously sent to the consumer. Indeed, a dependency may occur if a selected update UPD, depending on another selected update UPD', is replayed before that other update UPD'. When the asynchronous sender 5000 sends the updates in the order they were applied by the master (the replication log order), the selected update UPD is likely to be in dependency conflict with only one of the previously sent updates which are represented by the update sending state items. Therefore, the dependency builder 5002 can scan the update sending state items to compute the dependency indications attached to an update.

As explained above, dependencies for a selected update may only be related to the previously sent updates. However, as some of those previously sent updates may have been already replayed, they cannot cause a dependency conflict for the selected update anymore.

Therefore, the update sending state items 5006 of the master server 510 may be alternatively represented by the updates which have not yet been replayed among the previously sent updates.

The master server may obtain information about update replay through replay acknowledgments. When the consumer sends back a replay acknowledgment for an update UPD, this acknowledgment comprises an acknowledgment indication representing that update UPD. The master server may store the acknowledgment indications received from the master during a replication session in an acknowledgment indication storage.

Accordingly, the update sending state items may be maintained from this acknowledgment indication storage. In this case, each item in the update sending state items represents an update among the selected updates which have been previously sent to the consumer and not yet acknowledged.

The following description will be made in reference to update sending state items representing the updates that have been acknowledged among the previously sent updates, by way of example.

According to another embodiment of the invention, the dependency builder 5002 may both interact with the dependency array 5004 and the update state items 5006 to compute the dependency indications for a selected update, as will be described later in reference to FIGS. 17 through 19.

In complement, upon selecting the updates in the replication log in the order, the master server may attach to each selected update an ordering indication before transmitting it to the dependency builder. In particular, each ordering indication comprises an ordering number or Operation Change Number OCN increasingly attached to the selected updates. Thus, an OCN may be an increasing number starting from 1 for the first change to be sent in a given replication session. The asynchronous sender may send a selected update together with the OCN attached thereto and therefore the consumer will have information about the initial ordering of the updates which is consistent.

According to a suitable protocol, e.g. the Multi-Master Asynchronous Transport Replication Protocol, for each selected update to be sent, the asynchronous sender may send a replication update request to the consumer. The asynchronous sender may send multiple of them without waiting for response from the consumer.

The number of updates the supplier can send at the same time per replication update request may be limited by a group value. The number of replication update requests the supplier can send without waiting for an answer from the consumer may be limited by a credit value.

The group value and the value credit may be negotiated between the supplier and the consumer during the session initiation.

In reference to FIG. 11, an exemplary replication log 502 is shown, that comprises a history of the updates applied to the master replica. This replication log comprises updates UPD1 through UPD9.

The replication log is ordered according to the respective CSNs attached to the updates, and thus update UPD1 has the latest CSN while update UPD9 has the earliest CSN. From the update vector received from the consumer, the master server may have determined for example that the consumer has not yet received the updates comprised inside the dotted frame 60, i.e. updates UPD3 through the last update. The supplier selects a subset of these updates, e.g. UPD3 through UPD5 and attaches them respectively the numbers 1 through 3.

Thus, a sequence of updates to be sent comprises a number of updates UPD(p) through UPD(n) as represented in FIG. 9.

Figure 10:
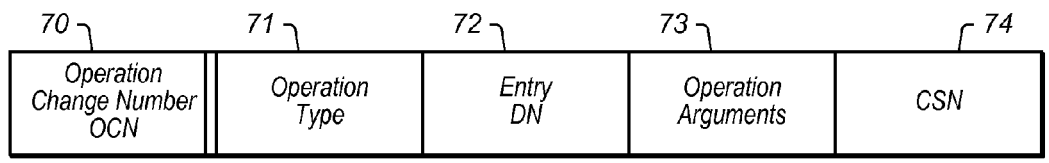

According to the invention, each update received by the dependency builder may contain the following information, as represented in FIG. 10:

an operation change sequence number, for update replay 70 a CSN representing the time at which the update was created 74, state information comprising the operation type of the update 71, the DN of the entry to modify 72 and possibly other operation arguments 73.

The dependency builder then computes the dependency indications for each selected update from those information, as will be described hereinafter in reference to FIGS. 17 through 19.

During a replication session, the supplier keeps track of the updates it has already sent to the consumer in the update sending state items. In particular, the updates represented in the update sending state items further correspond to updates which have been already acknowledged.

FIG. 17 is a general flowchart describing the operations performed by the dependency builder for computing dependency indications for an update UPD. These dependency indications will be sent to the consumer together with the update UPD.

The dependency builder parses the update sending state items at operation 302. As explained above, each update sending state item may represent an update which has been sent but not yet acknowledged from the consumer.

For each update sending state item being parsed, which represents an update UPD', the dependency builder inputs update UPD at the first input of the dependency array and update UPD' at the second input of the dependency array, at operation 306. The dependency array provides the dependency link dep of update UPD with respect to update UPD'.

At operation 308, the dependency builder determines whether the dependency link dep indicates that update UPD does not depend on update UPD', which may be expressed by a "null" value or a "0" value for example.

If update UPD depends on update UPD', the dependency builder generates, at operation 314, a dependency indication representing update UPD' inside the dependency indications attached to update UPD.

If update UPD does not depend on update UPD', the dependency builder determines whether all the update sending state items have been parsed at operation 310 and if not parses the next update sending state item at operation 312.

If all the update sending state items have been parsed, the dependency builder scans the contents of the dependency indications at operation 316. If the dependency indications contain values, the dependency builder transmits update UPD with these dependency indications to the asynchronous sender, at operation 320. If the dependency indications contain no value, (expressed by "dependency indications=null"), the dependency builder attaches a "no-dependency" value to the dependency indications of update UPD, at operation 318, before performing operation 320.

FIG. 18 is a flowchart representing the operations performed by the dependency builder, according to a particular embodiment of the invention where operation change numbers OCN are used.

According this particular embodiment of the invention, each update which has been previously sent and not yet acknowledged is represented in the update sending state items by its OCN. The update sending state items form a list L which is ordered according to the OCN contained therein.

Upon receiving an update OCN for computing its dependency indications, the dependency builder starts a first parsing of list L at operation 3002, from the lowest ordering number OCN_min to the highest ordering number OCN_max. The first parsing will be stopped as soon as an update OCN' is found in the list on which update OCN depends or until the end of the list is reached.

For each update being attached an ordering number OCN', the dependency builder passes update OCN at the first input of the dependency array and update OCN' at the second input of the dependency array. The dependency array provides the dependency link dep of update OCN with respect to update OCN'.

The dependency builder determines whether this dependency link dep indicates that update OCN does not depend on update OCN' ("dep=null") at operation 3006. If update OCN depends on update OCN', the dependency builder stops the first parsing at operation 3008 and goes to operation 400 which will be described below in reference to FIG. 19.

If update OCN does not depend on update OCN', the dependency builder determines whether the end of list L has been reached, i.e. if OCN matches OCN_max, at operation 3018. If not, the dependency builder processes the next update OCN' in list L, according to operations 3004 through 3018.

If the end of the list L has been reached, i.e. if OCN matches OCN_max, the result of the first parsing is that no dependency indication has been generated and the dependency indications are tagged with a "no-dependency" value at operation 3016. At operation 3018, update OCN is transmitted to the asynchronous sender.

FIG. 19 is a flowchart representing the sub-operations of operation 400. Operation 400 is performed if an update OCN' on which update UPD depends is found in list L.

The flowchart of FIG. 19 is to be implemented in a directory server system having a tree structure with "add", "delete", "modify" and "modifyRDN" operation types.

If update OCN has been found dependent on update OCN' at operation 3006 of FIG. 18, the dependency builder further determines whether update OCN has the operation type "delete" at operation 402 of FIG. 19.

If not, i.e update OCN has one of the operation types "add", "modify" and "modifyRDN", the dependency builder will add the change number OCN' in the dependency indications of update OCN at operation 404 and transmit update OCN together with its dependency indications to the asynchronous sender at operation 406.

Otherwise, if update OCN has an operation type "delete", the dependency builder starts a second parsing of list L, at operation 408, but this time, from the highest ordering number OCN_max to the lowest ordering number OCN_min=OCN'. This is because a "delete" operation on an entry dn is an operation that depends on a previous delete operation on an entry having dn", where entry dn is a child of entry dn", the entry dn being likely to have more than one child entry stored in the update sending state items.

During the second parsing, for each update OCN" in list L, the dependency builder gets the dependency link dep of update OCN with respect to update OCN" through the dependency array at operation 410. At operation 412, the dependency builder determines whether update OCN is independent of update OCN".

If update OCN is independent of update OCN", the dependency builder processes the next update OCN" in list L according to the operations 410 through 424 until OCN' is reached.

If update OCN is found dependent on update OCN" at operation 412, the second parsing is stopped and the dependency builder determines whether OCN" is equal to OCN', at operation 418. If OCN" is equal to OCN', the dependency builder adds OCN' in the dependency indications of update OCN at operation 422 and update OCN is transmitted to the asynchronous sender together with its dependency indications, at operation 424.

If OCN" is different from OCN', the dependency builder adds, in the dependency indications of update OCN, all the operation change numbers which are comprised between OCN' and OCN" inside list L, at operation 420. These dependency indications may be represented in the form of an interval having the limits OCN' and OCN", for example [OCN', OCN"], if OCN" is higher than OCN'. At operation 424, update OCN is then transmitted to the asynchronous sender together with its dependency indications.

Therefore, updates may be represented in the dependency indications by their ordering numbers.

The computing of the dependency indications may be very cheap when the update sending state items are limited in size by the credit value.

On the consumer side, such dependency indications may be used to improve the update replay which has been described in reference to FIGS. 12 and 13.

In particular, the dependency checker may scan the dependency indications for determining whether an update UPD depends on other updates among the selected updates.

FIGS. 14 through 16 describe how the selected updates are replayed by the consumer, according to the particular embodiment of the invention where operation change numbers OCN are used.

According to this embodiment of the invention, the consumer server comprises an incoming update storage or incoming update queue 5226, represented in FIG. 8, for storing the updates received from the supplier during a replication session. A received update comprises the OCN attached thereto, the state information represented in FIG. 10, and the dependency indications computed by the supplier. The incoming update queue is ordered according to the OCN attached to the updates.

Furthermore, the pending update items maintained by the dependency checker also form a queue or pending update queue, in which the updates are also ordered according to their OCN.

The committed update items maintained by the dependency checker also form a queue or committed update queue, in which the updates are ordered according to their OCN.

The following description will be made in reference to a directory server having a tree structure and comprising the operation types "add", "delete", "modify" and "modifyRDN", by way of example. According to this example, the dependency indications attached to an update OCN will either contain a single value OCN', an interval of the type [OCN_low, OCN_up], or a "no_dependency" value.

On the consumer side, an update OCN received by the consumer server may thus have the following dependency indications according to the particular embodiment of the invention:

a single value OCN' which means that update OCN depends on update OCN'. In this case the consumer has to replay update OCN only once update OCN' has been replayed;

an interval [OCN_low, OCN_up], which means that update OCN depends on the updates that have an operation change number comprised between OCN_low and OCN_up. In this case the consumer has to replay update OCN only once all the updates that have an operation change number comprised between OCN_low and OCN_up have been replayed.

a "no_dependency" value, which means that the consumer can replay update OCN immediately after its decoding.

FIG. 14 is a flowchart representing the operations performed by a dependency checker thread for replaying an update OCN.

During a replication session, this dependency checker thread gets the update having the lowest OCN in the incoming update queue at operation 202. While operation 202 is performed by this thread, the access to the incoming update queue is locked for the other threads. At operation 204, the dependency checker thread then determines whether update OCN depends on other uncommitted updates. This operation is described in FIG. 16. If not, the dependency checker thread transmits update OCN to the replay function. The operations performed by the update replay function is described in FIG. 15.

If update OCN depends on other uncommitted updates, update OCN is stored in the pending update queue, at operation 206.

At operation 210, the dependency checker thread determines if update OCN is the incoming update queue tail and if not returns to operation 202.

Otherwise, the dependency checker thread waits until the receipt of another selected update in the incoming update queue at operation 216 before returning to operation 202.

FIG. 15 represents the operations performed by a replay function thread on the consumer side.

Upon receiving an update OCN from the dependency checker at step 2080, the replay function thread applies update OCN to the consumer replica at operation 2082.

At operation 2084, the replay function sends afterwards an acknowledgment indication comprising the value "OCN" to the master server in order to indicate that update OCN has been replayed.

The replay function also adds update OCN in the committed update items at operation 2086 to locally indicate that update OCN has been replayed.

The replay function finally repeats operations 204 through 214 for each update in the pending update queue, at 2088. As update OCN has been replayed, operation 2088 is performed to check if one of the update in the pending update queue can be now replayed, i.e if one of the update in the pending update queue depends only on update OCN or depends on update OCN and on further updates which have been already replayed.

FIG. 16 is a flowchart describing the operation 204 of FIG. 14, performed by a dependency checker thread for determining whether an update OCN depends on uncommitted updates OCN'.

At operation 2042, the dependency checker thread gets the dependency indications DEP_OCN attached to update OCN. As seen above, these dependency indications were initially computed by the master server before sending update OCN and may comprise the operation change numbers which represent the updates on which update OCN depends, among the selected updates which were sent by the master server and not yet acknowledged at the computation time.

At operation 2044, the dependency checker thread determines whether the dependency indications DEP_OCN is tagged with "No_dependency". If so, the result is that update OCN is independent of uncommitted updates at 2050.

Otherwise, the dependency checker thread gets the committed update queue CUQ at operation 2046 and determines at operation 2048 whether the operation change numbers OCN' comprised in the dependency indications are further included in the committed update queue CUQ and if not the result is still that update OCN is independent of uncommitted updates at 2050.

If the dependency indications are represented in the form of an interval [OCN_low,OCN_up], operation 2048 may be performed by successively determining whether each update from OCN_low through OCN_up is comprised in the committed update queue, where OCN_low is the lowest limit of the interval and OCN_up is the upper limit of the interval.

The result will be that update OCN is independent of uncommitted updates OCN' at 2050, if all the OCN values comprised in the interval are found comprised in the committed update queue. However, the result will be that update OCN is dependent on uncommitted updates OCN' at 2050, as soon as an update is found whose operation change number is not comprised in the committed update queue.

In complement, the dependency checker may further maintain a Next Expected Change Number NECN to improve multithreading replay performances. The NECN represents the next change after the latest operation change number among the updates for which all the previous updates have been replayed.

Thus, an update having an OCN value that matches the NECN value is ensured to have no dependencies and therefore operation 208 can be performed immediately after operation 202, without performing operations 204 and 206 of FIG. 14.

More specifically, the NECN is set to 1 at the beginning of a replication session. On replaying an update whose OCN matches the NECN value, a dependency checker thread increments a first time the NECN value. If the new NECN value corresponds to an update that has been replayed, i.e. that is comprised in the committed update queue, this new NECN value may be incremented again until the obtained NECN value corresponds to an update that has not yet been replayed.

Moreover, when a NECN value is incremented by a given dependency checker thread, the access to NECN is locked for the other dependency checker threads to avoid conflicting changes on NECN.

An example will be described hereinafter illustrating the particular embodiment of the invention for use in a directory server system having a tree structure. This example will be described in reference to exhibit B.

The supplier may for example select the following updates from the replication log and increasingly attach them an OCN value, represented below in the form of "#i", where i is an increasing integer:

1: delete entry A, child of entry Z
2: delete entry B, child of entry Z
3: delete entry C, child of entry Z
4: add entry YY, child of entry WW
5: add entry TT, child of entry YY
6: add entry UU, child of entry YY
7: delete entry AB, child of entry X
8: delete entry AC, child of entry X
9: delete entry Z
10: delete entry X It is reminded that an entry cannot be deleted if it has child entries. Therefore, in the example, the entries A, B and C must be deleted before deleting entry z, and the entries AB and AC must be deleted before deleting entry X.

The array B1 of Exhibit B shows the dependency indications computed by the dependency builder for each entry represented by its ordering indication in the first column.

The value "0" for the dependency indications are equivalent to a "no_dependency" value. The dependency indications for an update "#i" may be either a single value representing an operation change number "#j" or "0" or an interval "[#k, #k+p]".

The selected updates are sent to the consumer with their ordering number and with the dependency indications attached thereto.

The arrays B2 through B5 of exhibit B show different steps of the replay on the consumer side.

The update processing state array contains the updates which can be replayed by the replay function. The pending update queue array contains the updates that are queued up and the committed update queue array contains the updates which have been replayed.

At the first step represented by the arrays B2, the consumer may:

replay simultaneously the updates #1, #2, #3, #4, #7 and #8 as they have dependency indications matching "0"; the NECN value is initially #1.

queue up the updates #5, #6, #9, #10 in the pending update queue based on their respective dependency indications and on the committed update queue which is empty (i.e no update has been replayed among updates #1 to #10).

At the next step represented by the arrays B3:

the committed update queue contains the updates #1, #2 and #3 which means that these updates have been replayed; the NECN value is #4.

Therefore, the consumer may:

dequeue the update #9 from the pending update queue. As a result, the pending update queue contains the updates #5, #6, #10;

replay update #9; the update processing state now contains the updates #4, #7 and #8 and #9 which may be replayed simultaneously.

At the next step represented by the arrays B4:

the committed update queue contains the updates #1, #2, #3, #7, and #8, which means that the updates #7 and #8 have further been replayed; the NECN value is still #4.

Therefore, the consumer may:

dequeue the update #10 from the pending update queue. As a result, the pending update queue contains the updates #5 and #6;

replay update #10; the update processing state now contains the updates #4 and #10 which may be replayed simultaneously.

At the next step represented by the arrays B5:

the committed update queue contains the updates #1, #2, #3, #7, #8 and #4 which me that the updates #4 has further been replayed; the NECN value is #5.

Therefore, the consumer may:

dequeue updates #5 and #6 from the pending update queue. As a result, the pending update queue does not contain updates anymore;

replay the updates #5 and #6; the update processing state now contains the updates #5, #6 and #10 which may be replayed simultaneously.

It would be understood by those skilled in the art that this example is a very static view of what could happen during a replication session, as all the updates may not be received in the same time by the consumer.

Exhibit A

|  | ADD(dn) | DEL(dn) | MOD(dn) | modRDN (dn→dn2) |
|---|---|---|---|---|
| previous ADD(dn) | 0 | 1 | 1 | 1 |
| previous ADD(dn') | 1 | 1 | 0 | 1 |
| previous DEL(dn) | 1 | 0 | 1 | 1 |
| previous DEL(dn') | 1 | 1 | 0 | 1 |
| previous DEL(dn") | 0 | 1 | 0 | 0 |
| previous modRDN(dn'→dn1) | 1 | 1 | 0 | 1 |
| previous modRDN(dn1→dn') | 1 | 0 | 0 | 0 |
| previous modRDN(dn→dn1) | 0 | 0 | 1 | 1 |
| previous modRDN(dn1→dn) | 0 | 0 | 0 | 1 | where:
entry dn' is the parent entry of entry dn,
entry dn" is a child entry of entry dn,
entries dn1 and dn2 represent entries which do not have such relationships with entry dn.

Exhibit B

| B.1- | |
|---|---|
| Ordering indications | dependency indications |
| #1 | 0 |
| #2 | 0 |
| #3 | 0 |
| #4 | 0 |
| #5 | #4 |
| #6 | #4 |
| #7 | 0 |
| #8 | 0 |
| #9 | [#1, #3] |
| #10 | [#7, #8] |

B.2-

| Update processing state | #1 | #2 | #3 | #4 | #7 | #8 | |
|---|---|---|---|---|---|---|---|
| Pending Update Queue | #5 | #6 | #9 | #10 | | | |
| Committed Update Queue | | | | | | | |

B.3-

| Update processing state | #4 | #7 | #8 | #9 | | | |
|---|---|---|---|---|---|---|---|
| Pending Update Queue | #5 | #6 | #10 | | | | |
| Committed Update Queue | #1 | #2 | #3 | | | | |

-continued

B.4-

| | | | | | | |
|---|---|---|---|---|---|---|
| Update processing state | #4 | #9 | #10 | | | |
| Pending Update Queue | #5 | #6 | | | | |
| Committed Update Queue | #1 | #2 | #3 | #7 | #8 | |

B.5-

| | | | | | | |
|---|---|---|---|---|---|---|
| Update processing state | #9 | #10 | #5 | #6 | | |
| Pending Update Queue | | | | | | |
| Committed Update Queue | #1 | #2 | #3 | #7 | #8 | #4 |

The invention claimed is:

1. A directory server system having a master server and a non-master server, wherein each server is configured to store directory server data comprising updates;
   said master server configured to:
      determine selected updates to the directory server data to send to the non-master server;
      send the selected updates to the non-master server asynchronously, wherein sending the updates asynchronously comprises sending each update to the non-master server without waiting for confirmation from the non-master server that previously sent updates have been completed at the non-master server;
   said non-master server having:
      a dependency checker operable for determining whether each update received from the master server depends on other updates among the selected updates, and if not for sending the update to an update application function,
      the update application function being operable for applying the updates received from the dependency checker in the non-master server directory server data;
   wherein the master server and the non-master server are both servers for the directory server data.

2. The directory server system of claim 1, wherein the dependency checker is responsive to the update depending on other updates among the selected updates for further determining whether said all the other updates have been applied to the non-master directory server data, and if not for adding an item representing said update in pending update items.

3. The directory server system as claimed in claim 2, wherein the update application function is further operable, upon applying an update to the non-master directory server data, for adding an item representing that update in update application state items.

4. The directory server system of claim 3, wherein the dependency checker is operable for determining whether said other updates have been applied to the non-master directory server data by scanning the update application state items.

5. The directory server system as claimed in claim 2, wherein the dependency checker is further responsive to said other updates being applied to the non-master directory server data, for sending said update to the update application function.

6. The directory server system as claimed in claim 1, wherein the update application function is further operable, upon applying an update to the non-master directory server data, for sending to the master server an acknowledgment indication representing that update.

7. The directory server system as claimed in claim 2, wherein the update application function is further operable, upon applying an update, for sequentially invoking the dependency checker for each update represented in the pending update items.

8. The directory server system as claimed in claim 1, wherein the master server has:
   a dependency builder capable of computing dependency indications for each update among the selected updates, each dependency indication representing an update among the selected updates on which said update depends,
   a sender for sending the selected updates to the non-master server, together with their respective dependency indications.

9. The directory server system of claim 8, wherein the dependency checker is operable for determining whether each update received from the master server depends on other updates among the selected updates, by scanning the dependency indications attached to said update.

10. The directory server system as claimed in claim 8, wherein each update has a creation time attached thereto indicating the time at which the update was locally created, and the master server has:
   an update log for storing a history of the updates applied to its directory server data, according to the creation times of the updates,
   the master server being capable of successively selecting the updates to be sent to the non-master from the update log.

11. The directory server system as claimed in claim 10, wherein the dependency builder has:
   a two input array, said array being filled based on predefined dependency links between existing update types and being responsive to a first update being inputted at a first input and a second update being inputted at a second input for providing a dependency value indicating the dependency link of the first update with respect to the second update, the dependency builder being capable of computing the dependency indications for a selected update from said two input array.

12. The directory server system as claimed in claim 11, wherein the master server maintains update sending state items, each item representing an update among the selected updates which have been previously sent to the non-master, the dependency builder being capable of computing the dependency indications for a selected update by scanning the update sending state items.

13. The directory server system of claim 12, wherein the master server has an acknowledgment indication storage for storing the acknowledgment indications received from the non-master, and
   the update sending state items represents the updates which are not represented in an acknowledgment indication storage among the selected updates which have been previously sent to the non-master.

14. The directory server system of claim 12, wherein the dependency builder is capable of:
   scanning the update sending state items, upon selection of an update, and for each update sending state item being scanned, inputting the selected update at the first input of the two input array and the update represented by said update sending state item at the second input of the two input array, and determining whether the dependency value provided by the two input array indicate that the selected update depends on the update represented by the update sending state item, and if so adding a representation of that update in the dependency indications.

15. The directory server system as claimed in claim 11, wherein the master server is further capable of attaching ordering indications to the updates selected from the update log, the sender being further capable of sending the ordering indication attached to a selected update together with that update.

16. The directory server system of claim 15, wherein said ordering indications comprise ordering numbers being increasingly attached to the selected updates.

17. The directory server system as claimed in claim 15, wherein each item representing an update in the update sending state items comprises the ordering indication attached to that update.

18. The directory server system of claim 15, wherein the acknowledgement indication sent by the update application function upon applying an update to the non-master directory server data comprises the ordering indication attached to that update.

19. The directory server system as claimed in claim 15, wherein each dependency indication representing an update in the update sending state items comprises the ordering indication attached to that update.

20. The directory server system as claimed in claim 15, wherein the non-master server comprises an incoming update storage for storing the updates received from the master server, said incoming update storage being ordered according to the ordering indications attached to the received updates, and the dependency checker is operable for selecting the update having the lowest ordering indication among the updates in the incoming update storage.

21. The directory server system as claimed in claim 14, wherein the update application state items are ordered according to the ordering indications attached to the updates.

22. The directory server system as claimed in claim 14, wherein the pending update storage is ordered according to the ordering indications attached to the received updates.

23. A method of operating a directory server system, having a master server and a non-master server, each server configured to store directory server data comprising updates, the method comprising said master server:

determining selected updates to the directory server data to send to the non-master server;

sending the selected updates to the non-master server asynchronously, wherein sending the updates asynchronously comprises sending each update to the non-master server without waiting for confirmation from the non-master server that previously sent updates have been completed at the non-master server; and said non-master server:

a) determining, by a dependency checker of the non-master server, whether each update received by the non-master server from the master server depends on other updates among the selected updates, and in response to determining that it does not, the dependency checker sending the update to an update application function of the non-master server;

b) applying, by the update application function of the non-master server, the update received from the dependency checker in the non-master server directory server data;

wherein the master server and the non-master server are both sewers for the directory sewer data.

24. The method of claim 23, further comprising the steps of:

c) if step a) succeeds, determining whether all the other updates on which the update depends have been applied to the non-master directory sewer data, and if step c) fails, d) adding an item representing said update in pending update items.

25. The method of claim 24, wherein step b) further comprises adding an item representing that update in update application state items.

26. The method of claim 25, wherein step c) comprises scanning the update application state items.

27. The method as claimed in claim 24, further comprising performing step b) if step c) succeeds.

28. The method as claimed in claim 23, wherein step b) comprises the further step of transmitting an acknowledgment indication representing the update applied from the non-master server to the master server.

29. The method as claimed in claim 23, wherein step b) comprises the further step of iteratively repeating steps a) and b) for each update represented in the pending update items, upon applying the update.

30. The method as claimed in claim 28, comprising the previous steps of:

i) computing dependency indications, in the master server, for each update among the selected updates, each dependency indication representing an update among the selected updates on which said update depends, ii) transmitting the selected updates from the master server to the non-master server, together with their respective dependency indications.

31. The method of claim 30, wherein step a) comprises scanning the dependency indications attached to the update.

32. The method as claimed in claim 30, in which the master server has a two input array, said array being filled based on predefined dependency links between existing update types and being responsive to a first update being inputted at a first input and a second update being inputted at a second input for providing a dependency value indicating the dependency link of the first update with respect to the second update, wherein step i) comprises computing the dependency indications for a selected update from said two input array.

33. The method as claimed in claim 32, in which the master sewer maintains update sending state items, each item representing an update among the selected updates which have been previously sent to the non-master, wherein step i) comprises computing the dependency indications for a selected update by scanning the update sending state items.

34. The method as claimed in claim 30, in which the master server maintains:

an acknowledgment indication storage for storing the acknowledgment indications received from the non-master, and update sending state items, each item representing an update among the selected updates which have been previously sent to the non-master and which are not represented in the acknowledgment indication storage, wherein step i) comprises computing the dependency indications for a selected update by scanning the update sending state items.

35. The method of claim 33, wherein step i) comprises the steps of:
   i1) scanning the update sending state items, upon selection of an update, and for each update sending state item being scanned,
   i2) inputting the selected update at the first input of the two input array and the update represented by said update sending state item at the second input of the two input array, and
   i3) determining whether the dependency value provided by the two input array indicate that the selected update depends on the update represented by the update sending state item, and if so adding a representation of that update in the dependency indications.

36. The method as claimed in claim 33, in which each update has a creation time attached thereto indicating the time at which the update was locally created, and the master server has an update log for storing a history of the updates applied to its directory server data, according to the creation times of the updates,
   the master server being capable of successively selecting the updates to be sent to the non-master from the update log, wherein:
   step i) comprises the previous step of attaching ordering indications to the updates selected from the update log, in the master server, and step ii) comprises transmitting the ordering indication attached to a selected update together with the update.

37. The method as claimed in claim 36, wherein the non-master server comprises an incoming update storage for storing the updates received from the master server, said incoming update storage being ordered according to the ordering indications attached to the received updates, wherein step a) comprises the previous step of selecting the update having the lowest ordering indication among the updates in the incoming update storage.

* * * * *

UNITED STATES PATENT AND TRADEMARK OFFICE
CERTIFICATE OF CORRECTION

PATENT NO. : 7,584,174 B2
APPLICATION NO. : 10/835977
DATED : September 1, 2009
INVENTOR(S) : Marcos Ares Blanco and Joseph Reveane It is certified that error appears in the above-identified patent and that said Letters Patent is hereby corrected as shown below:

Claim 23, col. 24, line 6, please delete "sewers" and "sewer" and insert --servers-- and --server-- in place thereof.

Claim 24, col. 24, line 11, please delete "sewer" and insert --server-- in place thereof.

Claim 33, col. 24, line 52, please delete "sewer" and insert --server-- in place thereof.

Signed and Sealed this

Tenth Day of November, 2009

David J. Kappos
*Director of the United States Patent and Trademark Office*